(12) United States Patent
Deng et al.

(10) Patent No.: US 12,722,536 B2
(45) Date of Patent: Sep. 1, 2026

(54) CONTRACTING MEMBER POSITION CONTROL AND/OR STATE MONITORING

(71) Applicant: Toyota Motor Engineering & Manufacturing North America, Inc., Plano, TX (US)

(72) Inventors: Xintong Deng, Plymouth, MI (US); Yufei Zhu, Ypsilanti, MI (US); Michael Paul Rowe, Pinckney, MI (US); Erin Rutledge, Tipton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 8 days.

(21) Appl. No.: 18/758,043

(22) Filed: Jun. 28, 2024

(65) Prior Publication Data

US 2026/0001451 A1 Jan. 1, 2026

(51) Int. Cl.
*B60N 2/02* (2006.01)
*B60N 2/16* (2006.01)

(52) U.S. Cl.
CPC ......... *B60N 2/0278* (2023.08); *B60N 2/0248* (2013.01); *B60N 2/164* (2013.01)

(58) Field of Classification Search
CPC ..... B60N 2/0278; B60N 2/0248; B60N 2/164
See application file for complete search history.

(56) References Cited

U.S. PATENT DOCUMENTS 278,787 A 6/1883 Fannin
1,658,669 A 2/1928 Cohn et al.
1,741,109 A 12/1929 Heimerdinger
1,802,904 A 4/1931 Bryant
2,322,755 A 6/1943 Voorhies
2,327,683 A 8/1943 Warner et al.
2,508,804 A 5/1950 Schwindt
2,588,706 A 3/1952 Davis
(Continued)

FOREIGN PATENT DOCUMENTS

CN 201037277 3/2008
CN 101367433 A 2/2009
(Continued)

OTHER PUBLICATIONS

Barbarino et al., "A review on shape memory alloys with applications to morphing aircraft", Smart Materials and Structures, Apr. 2014 (19 pages).

(Continued)

*Primary Examiner* — Peter D Nolan
*Assistant Examiner* — Demetra R Smith-Stewart
(74) *Attorney, Agent, or Firm* — Christopher G. Darrow; Darrow Mustafa PC

(57) ABSTRACT

A state of a contracting member (e.g., a shape memory material member) in an actuator can be monitored. When activated, the actuator can be configured to morph into an activated configuration in which a dimension of the actuator increases. A sensor can be configured to acquire sensor data. The sensor can be a strain gauge. The contracting member can operatively engage the sensor. One or more processors can be operatively connected to monitor a state of the shape memory material member based on the sensor data.

27 Claims, 13 Drawing Sheets

(56) References Cited

U.S. PATENT DOCUMENTS 3,394,631 A 7/1968 Thompson
3,706,102 A 12/1972 Grenier
4,063,826 A 12/1977 Riepe
4,244,140 A 1/1981 Kim
4,275,561 A 6/1981 Wang
4,396,220 A 8/1983 Dieckmann et al.
4,498,851 A 2/1985 Kolm et al.
4,522,447 A 6/1985 Snyder et al.
4,541,885 A 9/1985 Caudill, Jr.
4,544,988 A 10/1985 Hochstein
4,553,393 A 11/1985 Ruoff
4,595,338 A 6/1986 Kolm et al.
4,779,852 A 10/1988 Wassell
4,780,062 A 10/1988 Yamada et al.
4,806,815 A 2/1989 Homma
4,811,564 A 3/1989 Palmer
4,834,619 A 5/1989 Walton
4,898,426 A 2/1990 Schulz et al.
4,923,000 A 5/1990 Nelson
4,944,755 A 7/1990 Hennequin et al.
4,955,196 A 9/1990 Lin et al.
4,964,402 A 10/1990 Grim et al.
5,069,219 A 12/1991 Knoblich
5,088,115 A 2/1992 Napolitano
5,127,228 A 7/1992 Swenson
5,129,753 A 7/1992 Wesley et al.
5,250,167 A 10/1993 Adolf et al.
5,255,390 A 10/1993 Gross et al.
5,279,123 A 1/1994 Wechsler et al.
5,319,248 A 6/1994 Endou
5,482,351 A 1/1996 Young et al.
5,488,255 A 1/1996 Sato et al.
5,509,923 A 4/1996 Middleman et al.
5,522,712 A 6/1996 Winn
5,583,844 A 12/1996 Wolf et al.
5,619,177 A 4/1997 Johnson et al.
5,622,482 A 4/1997 Lee
5,662,376 A 9/1997 Breuer et al.
5,678,247 A 10/1997 Vickers
5,686,003 A 11/1997 Ingram et al.
5,747,140 A 5/1998 Heerklotz
5,771,742 A 6/1998 Bokaie et al.
5,846,629 A 12/1998 Gwinn
5,853,005 A 12/1998 Scanlon
5,861,703 A 1/1999 Losinski
6,043,978 A 3/2000 Mody et al.
6,053,553 A 4/2000 Hespelt
6,093,910 A 7/2000 McClintock et al.
6,116,257 A 9/2000 Yokota et al.
6,142,563 A 11/2000 Townsend et al.
6,155,716 A 12/2000 Okamura
6,186,047 B1 2/2001 Baruffaldi
6,227,515 B1 5/2001 Broyles
6,326,707 B1 * 12/2001 Gummin ............ F03G 7/06143
310/12.32
6,379,393 B1 4/2002 Mavroidis et al.
6,394,001 B1 5/2002 Giesey et al.
6,404,098 B1 6/2002 Kayama et al.
6,422,010 B1 7/2002 Julien
6,443,524 B1 9/2002 Yu
6,450,725 B1 9/2002 Roth et al.
6,481,799 B1 11/2002 Whalen
6,508,437 B1 1/2003 Davis et al.
6,530,217 B1 3/2003 Yokota et al.
6,546,806 B1 4/2003 Varma
6,591,188 B1 7/2003 Ohler
6,628,522 B2 9/2003 Trautman et al.
6,664,718 B2 12/2003 Perline et al.
6,719,694 B2 4/2004 Weng et al.
6,740,994 B2 5/2004 Lee et al.
6,773,535 B1 8/2004 Wetzel
6,809,462 B2 10/2004 Pelrine et al.
6,896,324 B1 5/2005 Kull et al.
6,910,714 B2 6/2005 Browne et al.
6,912,748 B2 7/2005 VanSickle
6,943,653 B2 9/2005 Hanke et al.
6,972,659 B2 12/2005 von Behrens et al.
6,998,546 B1 2/2006 Schmidt et al.
7,017,345 B2 3/2006 Von Behrens et al.
7,086,322 B2 8/2006 Schulz
7,093,903 B2 8/2006 O'Connor et al.
7,100,990 B2 9/2006 Kimura et al.
7,108,316 B2 9/2006 Barvosa-Carter et al.
7,117,673 B2 10/2006 Szilagyi
7,125,077 B2 10/2006 Frank
7,204,472 B2 4/2007 Jones et al.
7,219,464 B1 * 5/2007 Kujawa ................. A01K 97/08
211/8
7,237,847 B2 7/2007 Hancock et al.
7,256,518 B2 8/2007 Gummin
7,293,836 B2 11/2007 Browne et al.
7,306,187 B2 12/2007 Lavan
7,309,104 B2 12/2007 Browne et al.
7,331,616 B2 2/2008 Brei et al.
7,336,486 B2 2/2008 Mongia
7,350,851 B2 4/2008 Barvosa-Carter et al.
7,364,211 B2 4/2008 Niskanen et al.
7,371,052 B2 5/2008 Koeneman
7,446,450 B2 11/2008 Boland et al.
7,448,678 B2 11/2008 Browne et al.
7,476,224 B2 1/2009 Petrakis
7,478,845 B2 1/2009 Mankame et al.
7,484,735 B2 2/2009 Verbrugge et al.
7,501,607 B2 3/2009 Camm et al.
7,506,937 B2 3/2009 Bequet
7,511,402 B2 3/2009 Ito et al.
7,527,312 B1 5/2009 Cucknell et al.
7,556,313 B2 7/2009 Browne et al.
7,578,661 B2 8/2009 Koeneman
7,594,697 B2 9/2009 Browne et al.
7,619,894 B2 11/2009 Wang et al.
7,661,764 B2 2/2010 Ali et al.
7,669,799 B2 3/2010 Elzey
7,709,995 B2 5/2010 Hanlon et al.
7,717,520 B2 5/2010 Boren et al.
7,729,828 B2 6/2010 Gandhi
7,731,279 B2 6/2010 Asada et al.
7,735,940 B2 6/2010 Chiu
7,756,246 B2 7/2010 Mikami et al.
7,758,121 B2 7/2010 Browne et al.
7,766,423 B2 8/2010 Alexander et al.
7,770,391 B2 8/2010 Melz
7,814,810 B2 10/2010 Mitteer
7,823,382 B2 11/2010 Ukpai et al.
7,823,972 B2 11/2010 Browne et al.
7,834,527 B2 11/2010 Rivera et al.
7,878,459 B2 2/2011 Mabe et al.
7,883,148 B2 2/2011 Alexander et al.
7,892,630 B1 2/2011 McKnight et al.
7,901,524 B1 3/2011 McKnight et al.
7,905,538 B2 3/2011 Ukpai et al.
7,905,547 B2 3/2011 Lawall et al.
7,909,403 B2 3/2011 Lawall et al.
7,964,290 B2 6/2011 Mullner et al.
7,965,509 B2 6/2011 Campbell et al.
7,971,296 B2 7/2011 Jansen
7,971,939 B2 7/2011 Fujita et al.
8,016,952 B2 9/2011 Ishida et al.
8,038,215 B2 10/2011 Di Giusto et al.
8,052,112 B2 11/2011 Lawall et al.
8,056,335 B1 11/2011 Brown
8,100,471 B2 1/2012 Lawall et al.
8,109,567 B2 2/2012 Alexander et al.
8,126,615 B2 2/2012 McMillen et al.
8,172,458 B2 5/2012 Petrakis
8,209,976 B2 * 7/2012 Vaidyanathan ..... F03G 7/06145
60/528
8,240,677 B2 8/2012 Browne et al.
8,313,108 B2 11/2012 Ac et al.
8,362,882 B2 1/2013 Heubel et al.
8,366,057 B2 2/2013 Vos et al.
8,414,366 B2 4/2013 Browne et al.
8,446,475 B2 5/2013 Topliss et al.
8,448,435 B2 5/2013 Gregory et al.

(56) References Cited

U.S. PATENT DOCUMENTS 8,464,557 B2 * 6/2013 Shibuta ............ C03B 37/01205 65/435
8,510,924 B2 8/2013 Mankame et al.
8,584,456 B1 11/2013 McKnight
8,585,456 B2 11/2013 Canon
8,593,568 B2 11/2013 Topliss et al.
8,649,242 B2 2/2014 Martin et al.
8,681,496 B2 3/2014 Dede
8,695,334 B2 4/2014 Lewis et al.
8,702,120 B2 4/2014 Kalisz et al.
8,706,305 B2 * 4/2014 Jiang ...................... F03G 7/066 700/275
8,721,557 B2 5/2014 Chen et al.
8,741,076 B2 6/2014 Gao et al.
8,756,933 B2 6/2014 Topliss et al.
8,793,821 B2 8/2014 Fowkes et al.
8,827,709 B1 9/2014 Gurule et al.
8,830,335 B2 9/2014 Topliss et al.
8,853,916 B2 10/2014 Browne et al.
8,880,141 B2 11/2014 Chen
8,881,347 B2 11/2014 Feinstein
8,894,142 B2 11/2014 Alexander et al.
8,912,709 B2 12/2014 Pollock et al.
8,991,769 B2 3/2015 Gandhi
8,998,320 B2 4/2015 Mankame et al.
9,068,561 B2 6/2015 Gondo
9,086,069 B2 7/2015 Dede
9,140,243 B2 9/2015 Gandhi et al.
9,168,814 B2 10/2015 Gandhi
9,171,686 B2 10/2015 Alacqua et al.
9,180,525 B2 11/2015 Park et al.
9,221,440 B2 * 12/2015 Drennen ................ B60T 8/172
9,267,495 B2 2/2016 Kopfer et al.
9,298,207 B2 3/2016 Li
9,347,609 B2 5/2016 Pinto, IV et al.
9,428,088 B1 8/2016 Rajasingham
9,457,813 B2 10/2016 Hoerwick et al.
9,457,887 B2 10/2016 Roe et al.
9,495,875 B2 11/2016 Dowdall et al.
9,512,829 B2 12/2016 Alacqua et al.
9,550,466 B2 1/2017 Gandhi
9,588,020 B2 3/2017 Browne et al.
9,662,197 B2 5/2017 Yun et al.
9,664,182 B2 5/2017 Nicolini et al.
9,664,210 B2 5/2017 Ou et al.
9,684,183 B2 6/2017 Brown et al.
9,696,175 B2 7/2017 Hansen et al.
9,697,708 B2 7/2017 Adrezin et al.
9,714,460 B2 7/2017 Merideth
9,719,534 B2 8/2017 Shevchenko et al.
9,731,828 B2 8/2017 Lichota
9,764,220 B2 9/2017 Keating et al.
9,784,249 B2 10/2017 Li et al.
9,784,590 B2 10/2017 Englehardt et al.
9,827,888 B2 11/2017 Patrick et al.
9,848,814 B2 12/2017 Benson et al.
9,943,437 B2 4/2018 Lowe et al.
9,945,490 B2 4/2018 Dankbaar et al.
9,981,421 B2 5/2018 Macroe et al.
9,994,136 B2 6/2018 Nakada
10,007,263 B1 6/2018 Fields et al.
10,029,618 B2 7/2018 Perez Astudillo et al.
10,059,334 B1 8/2018 Zhu et al.
10,061,350 B2 8/2018 Magi
10,066,829 B2 9/2018 Wong et al.
10,119,870 B2 * 11/2018 Rehfus .................... H02K 7/06
10,168,782 B1 1/2019 Tchon et al.
10,191,550 B1 1/2019 Nussbaum et al.
10,208,823 B2 2/2019 Kashani
10,299,520 B1 5/2019 Shaffer et al.
10,302,586 B2 5/2019 Sun et al.
10,315,771 B1 6/2019 Rao et al.
10,330,144 B1 6/2019 Alqasimi et al.
10,330,400 B2 6/2019 Dede
10,335,044 B2 7/2019 Banet et al.
10,349,543 B2 7/2019 Sreetharan et al.
10,355,624 B2 7/2019 Majdi et al.
10,371,229 B2 8/2019 Gandhi et al.
10,371,299 B2 8/2019 Leffler
10,377,278 B2 8/2019 Ketels et al.
10,427,634 B2 10/2019 Gandhi et al.
10,434,973 B2 10/2019 Gandhi et al.
10,441,491 B2 10/2019 Wyatt et al.
10,459,475 B2 10/2019 Gandhi et al.
10,479,246 B2 11/2019 Meingast et al.
10,532,672 B1 1/2020 Pinkelman et al.
10,583,757 B2 3/2020 Ketels et al.
10,591,078 B2 3/2020 Oehler et al.
10,647,237 B2 5/2020 Song
10,677,310 B2 6/2020 Gandhi et al.
10,682,931 B2 6/2020 Rowe et al.
10,759,320 B2 9/2020 Mochizuki
10,773,487 B2 9/2020 Frigerio et al.
10,781,800 B2 9/2020 Brown et al.
10,814,514 B2 10/2020 Aihara
10,843,611 B2 11/2020 Caruss et al.
10,933,974 B2 3/2021 Tsuruta et al.
10,960,793 B2 3/2021 Gandhi et al.
10,965,172 B2 3/2021 Dede et al.
10,993,526 B2 5/2021 Vandewall et al.
10,995,779 B2 5/2021 Keplinger et al.
11,048,329 B1 6/2021 Lee et al.
11,091,060 B2 8/2021 Pinkelman et al.
11,125,248 B2 9/2021 Joshi et al.
11,137,045 B2 10/2021 Gandhi et al.
11,180,052 B2 11/2021 Severgnini et al.
11,215,170 B2 * 1/2022 Zamani .................. G05D 15/01
11,241,842 B2 2/2022 Gandhi et al.
11,247,584 B2 2/2022 Breitweg et al.
11,248,592 B1 2/2022 Tsuruta et al.
11,269,891 B2 3/2022 Frank et al.
11,285,844 B2 3/2022 Gandhi et al.
11,353,009 B1 6/2022 Rowe et al.
11,356,255 B1 6/2022 Emelyanov et al.
11,370,330 B2 6/2022 Gandhi et al.
11,372,481 B2 6/2022 Leroy et al.
11,377,007 B2 7/2022 Samain et al.
11,421,664 B1 8/2022 Rowe et al.
11,458,874 B2 10/2022 Nagai et al.
11,460,009 B1 10/2022 Tsuruta et al.
11,460,010 B1 10/2022 Tsuruta et al.
11,467,669 B2 10/2022 Liu et al.
11,472,325 B1 10/2022 Tsuruta et al.
11,486,421 B2 11/2022 Keplinger et al.
11,536,255 B1 12/2022 Rowe
11,541,820 B2 1/2023 Rea et al.
11,542,925 B1 1/2023 Rowe et al.
11,577,471 B2 2/2023 Gandhi et al.
11,585,128 B2 2/2023 Ketels et al.
11,591,076 B2 2/2023 Song et al.
11,592,010 B1 2/2023 Panwar et al.
11,592,037 B1 2/2023 Rowe et al.
11,603,153 B1 3/2023 Trager et al.
11,603,828 B2 3/2023 Gummin et al.
11,624,376 B2 4/2023 Rowe et al.
11,628,898 B1 4/2023 Trager et al.
11,642,083 B2 5/2023 Severgnini et al.
11,649,808 B2 5/2023 Tsuruta et al.
11,668,287 B2 6/2023 Naly et al.
11,680,559 B1 6/2023 Rowe et al.
11,702,015 B2 7/2023 Pinkelman et al.
11,732,735 B2 8/2023 Song et al.
11,750,115 B2 9/2023 Saneyoshi et al.
11,752,901 B2 9/2023 Gandhi et al.
11,795,924 B2 10/2023 Rowe
11,840,161 B2 12/2023 Schmalenberg et al.
11,841,008 B1 12/2023 Panwar et al.
11,885,428 B2 1/2024 Panwar et al.
11,897,379 B2 2/2024 Tsuruta et al.
11,913,436 B2 2/2024 Easton et al.
11,927,206 B2 3/2024 Rowe et al.
12,234,811 B1 * 2/2025 Rowe .................. F03G 7/06143
2002/0113499 A1 8/2002 Von et al.
2002/0130754 A1 9/2002 Alacqua et al.

(56) References Cited

U.S. PATENT DOCUMENTS

2002/0179663 A1 12/2002 Moore et al.
2002/0185932 A1 12/2002 Gummin et al.
2003/0000605 A1 1/2003 Homma
2003/0182041 A1 9/2003 Watson
2004/0035108 A1 2/2004 Szilagyi
2004/0041998 A1 3/2004 Haddad
2004/0104580 A1 6/2004 Spiessl et al.
2004/0118854 A1 6/2004 Kutun
2004/0145230 A1 7/2004 Fujita et al.
2004/0195888 A1 10/2004 Frye
2004/0256920 A1 12/2004 Gummin et al.
2004/0261411 A1 12/2004 MacGregor
2005/0023086 A1 2/2005 Szilagyi
2005/0066810 A1 3/2005 Schulz
2005/0082897 A1 4/2005 Ropp et al.
2005/0111177 A1 5/2005 Kwitek
2005/0146147 A1 7/2005 Niskanen et al.
2005/0198904 A1 9/2005 Browne et al.
2005/0199455 A1 9/2005 Browne
2005/0199845 A1 9/2005 Jones et al.
2005/0206096 A1 9/2005 Browne et al.
2005/0210874 A1 9/2005 Browne et al.
2005/0211198 A1 9/2005 Froeschle et al.
2005/0227607 A1 10/2005 Stevenson et al.
2005/0253425 A1 11/2005 Asada et al.
2006/0033312 A1 2/2006 Barvosa-Carter et al.
2006/0038643 A1 2/2006 Xu et al.
2006/0038745 A1 2/2006 Naksen et al.
2006/0074325 A1 4/2006 Karo et al.
2006/0201149 A1 9/2006 Biggs et al.
2006/0223637 A1 10/2006 Rosenberg
2006/0226013 A1 10/2006 Decre et al.
2006/0244293 A1 11/2006 Buffa
2006/0265965 A1 11/2006 Butera et al.
2007/0025575 A1 2/2007 Oser et al.
2007/0046074 A1 3/2007 Satta et al.
2007/0063566 A1 3/2007 Browne et al.
2007/0084220 A1 4/2007 Asada et al.
2007/0188004 A1 8/2007 Browne et al.
2007/0205853 A1 9/2007 Taya et al.
2007/0209213 A1 9/2007 Chorpash
2007/0236071 A1 10/2007 Fujita et al.
2007/0246285 A1 10/2007 Browne et al.
2007/0246898 A1 10/2007 Keefe et al.
2007/0246979 A1 10/2007 Browne et al.
2007/0271939 A1 11/2007 Ichigaya
2007/0277877 A1 12/2007 Ghorbal et al.
2008/0006353 A1 1/2008 Elzey et al.
2008/0010912 A1 1/2008 Hanson et al.
2008/0018198 A1 1/2008 Sohn et al.
2008/0085436 A1 4/2008 Langan et al.
2008/0100118 A1 5/2008 Young et al.
2008/0114218 A1 5/2008 Suyama et al.
2008/0219501 A1 9/2008 Matsumoto
2008/0267770 A1 10/2008 Webster et al.
2008/0271559 A1 11/2008 Garscha et al.
2008/0272259 A1 11/2008 Zavattieri et al.
2008/0307786 A1 12/2008 Hafez et al.
2009/0008973 A1 1/2009 Browne
2009/0009656 A1 1/2009 Honda et al.
2009/0030576 A1 1/2009 Periot et al.
2009/0041085 A1 2/2009 Petrakis
2009/0074993 A1 3/2009 Gao et al.
2009/0108607 A1 4/2009 Browne et al.
2009/0115284 A1 5/2009 Liang et al.
2009/0131752 A1 5/2009 Park
2009/0143730 A1 6/2009 De Polo et al.
2009/0173305 A1 7/2009 Alexander et al.
2009/0212158 A1 8/2009 Mabe et al.
2009/0218858 A1 9/2009 Lawall et al.
2009/0224584 A1 9/2009 Lawall et al.
2009/0224587 A1 9/2009 Lawall et al.
2009/0241537 A1 10/2009 Browne et al.
2009/0242285 A1 10/2009 Whetstone, Jr.
2009/0283643 A1 11/2009 Sar et al.
2009/0284059 A1 11/2009 Gupta et al.
2010/0001568 A1 1/2010 Trybus et al.
2010/0027119 A1 2/2010 Kollar et al.
2010/0031525 A1 2/2010 Allezy et al.
2010/0036567 A1 2/2010 Gandhi
2010/0066142 A1 3/2010 Gross et al.
2010/0117663 A1 5/2010 Herrera et al.
2010/0192567 A1 8/2010 Butera
2010/0212312 A1 8/2010 Rudduck
2010/0221124 A1 9/2010 Ikushima et al.
2010/0244505 A1 9/2010 Demick et al.
2010/0275592 A1 11/2010 Topliss et al.
2010/0282902 A1 11/2010 Rajasingham
2010/0287965 A1 11/2010 Bryant
2010/0294476 A1 11/2010 Gomi et al.
2010/0308689 A1 12/2010 Rahman et al.
2010/0326070 A1 12/2010 Hao et al.
2011/0004346 A1* 1/2011 Jiang ...................... G01L 5/103 702/42
2011/0017103 A1 1/2011 Lee
2011/0021932 A1 1/2011 Kim et al.
2011/0030380 A1 2/2011 Widdle, Jr. et al.
2011/0038727 A1 2/2011 Vos et al.
2011/0111839 A1 5/2011 Lesley et al.
2011/0120119 A1 5/2011 Alexander et al.
2011/0150669 A1 6/2011 Frayne et al.
2011/0179786 A1* 7/2011 Topliss .................... G02B 7/08 60/527
2011/0179790 A1 7/2011 Pretorius
2011/0217031 A1 9/2011 Eromaki
2011/0300358 A1 12/2011 Blohowiak et al.
2012/0019216 A1 1/2012 Lewis et al.
2012/0049095 A1 3/2012 Yamasaki
2012/0056459 A1 3/2012 Harden
2012/0081337 A1 4/2012 Camp, Jr. et al.
2012/0109025 A1 5/2012 Weinberg et al.
2012/0136126 A1 5/2012 Rousseau
2012/0181896 A1 7/2012 Kornbluh et al.
2012/0232783 A1 9/2012 Calkins et al.
2012/0237309 A1 9/2012 Park et al.
2012/0239183 A1 9/2012 Mankame et al.
2012/0267928 A1 10/2012 Mankame et al.
2012/0276807 A1 11/2012 Cabrera
2012/0292155 A1 11/2012 Gunter
2012/0297763 A1 11/2012 Mankame et al.
2012/0319445 A1 12/2012 Zolno et al.
2013/0005442 A1 1/2013 Erickson et al.
2013/0011806 A1 1/2013 Gao et al.
2013/0043354 A1 2/2013 Shome et al.
2013/0075210 A1 3/2013 Langbein et al.
2013/0098029 A1 4/2013 Pinto, IV et al.
2013/0188313 A1 7/2013 Dede
2013/0205770 A1 8/2013 Browne et al.
2013/0227943 A1 9/2013 Mance et al.
2014/0130491 A1 5/2014 Gandhi et al.
2014/0168894 A1 6/2014 Dede
2014/0196633 A1 7/2014 Shaw
2014/0207333 A1 7/2014 Vandivier et al.
2014/0210240 A1 7/2014 Muck et al.
2014/0217792 A1 8/2014 Meyer
2014/0239677 A1 8/2014 Laib et al.
2014/0250881 A1 9/2014 Yamamoto
2014/0265468 A1 9/2014 Greenhill et al.
2014/0265479 A1 9/2014 Bennett
2014/0277739 A1 9/2014 Kornbluh et al.
2014/0298794 A1 10/2014 Flaschentrager et al.
2014/0314976 A1 10/2014 Niiyama et al.
2014/0316269 A1 10/2014 Zhang et al.
2014/0333088 A1 11/2014 Lang et al.
2014/0338324 A1 11/2014 Jasklowski
2015/0016968 A1 1/2015 Grabowska et al.
2015/0114270 A1 4/2015 Tsuchida
2015/0130220 A1 5/2015 Preisler et al.
2015/0185764 A1 7/2015 Magi
2015/0197173 A1 7/2015 Hulway
2015/0202993 A1 7/2015 Mankame et al.
2015/0274078 A1 10/2015 Alacqua et al.
2015/0289994 A1 10/2015 Engeberg et al.
2015/0290015 A1 10/2015 Elahinia et al.

(56) References Cited

U.S. PATENT DOCUMENTS

2015/0331488 A1 11/2015 Grant et al.
2015/0366350 A1 12/2015 DiCenso et al.
2016/0004298 A1 1/2016 Mazed et al.
2016/0032997 A1 2/2016 Seepersad et al.
2016/0061345 A1 3/2016 Jackson, Jr.
2016/0082984 A1 3/2016 Schmidt
2016/0084665 A1 3/2016 Englehardt et al.
2016/0123793 A1 5/2016 Kollich et al.
2016/0169213 A1 6/2016 Calkins et al.
2016/0221475 A1 8/2016 Sugiyama
2016/0246374 A1 8/2016 Carter et al.
2016/0278459 A1 9/2016 Hilty
2016/0325837 A1 11/2016 Erhel et al.
2016/0339801 A1 11/2016 Pereny et al.
2016/0345088 A1 11/2016 Vilermo et al.
2016/0375459 A1 12/2016 deVilliers et al.
2016/0375835 A1 12/2016 Murray et al.
2017/0116792 A1 4/2017 Jelinek et al.
2017/0121068 A1 5/2017 Foshansky et al.
2017/0123499 A1 5/2017 Eid
2017/0148102 A1 5/2017 Franke et al.
2017/0153707 A1 6/2017 Subramanian et al.
2017/0158104 A1 6/2017 Le et al.
2017/0166222 A1 6/2017 James
2017/0174236 A1 6/2017 Worden et al.
2017/0203432 A1 7/2017 Andrianesis
2017/0240075 A1 8/2017 McCoy et al.
2017/0252260 A1 9/2017 Gummin et al.
2017/0328384 A1 11/2017 Goto et al.
2017/0355288 A1 12/2017 Barbat et al.
2017/0361733 A1 12/2017 Gage
2018/0001113 A1 1/2018 Streeter
2018/0012433 A1 1/2018 Ricci
2018/0036198 A1 2/2018 Mergl et al.
2018/0073491 A1 3/2018 Gissen et al.
2018/0084915 A1 3/2018 Norman et al.
2018/0111511 A1 4/2018 Lota
2018/0115260 A1 4/2018 Chiba et al.
2018/0130347 A1 5/2018 Ricci et al.
2018/0132825 A1 5/2018 Tachibana
2018/0134191 A1 5/2018 Ketels et al.
2018/0141562 A1 5/2018 Singhal
2018/0148007 A1 5/2018 Gage et al.
2018/0149141 A1 5/2018 Cullen et al.
2018/0151035 A1 5/2018 Maalouf et al.
2018/0178808 A1 6/2018 Zhao et al.
2018/0249772 A1 9/2018 Koo et al.
2018/0251234 A1 9/2018 Wang
2018/0264975 A1 9/2018 Bonk et al.
2018/0281621 A1 10/2018 Kaku et al.
2018/0286189 A1 10/2018 Motamedi et al.
2018/0321703 A1 11/2018 Gandhi et al.
2018/0345841 A1 12/2018 Prokhorov et al.
2018/0348759 A1 12/2018 Freeman et al.
2018/0355991 A1 12/2018 Pfahler
2019/0005272 A1 1/2019 Gault et al.
2019/0023161 A1 1/2019 Sullivan et al.
2019/0039525 A1 2/2019 Hu
2019/0041986 A1 2/2019 Rihn et al.
2019/0042857 A1 2/2019 Endo et al.
2019/0059608 A1 2/2019 Yan et al.
2019/0061307 A1 2/2019 Chen et al.
2019/0083022 A1 3/2019 Huang
2019/0135150 A1 5/2019 Gao et al.
2019/0143869 A1 5/2019 Sequi et al.
2019/0154122 A1 5/2019 Lima et al.
2019/0193615 A1 6/2019 Mankame et al.
2019/0197842 A1 6/2019 Long et al.
2019/0232842 A1 8/2019 Boccuccia et al.
2019/0291649 A1 9/2019 Ito
2020/0010001 A1 1/2020 Pinkelman et al.
2020/0015493 A1 1/2020 Ergun et al.
2020/0015593 A1* 1/2020 Norman ................. A47C 7/723
2020/0032822 A1 1/2020 Keplinger et al.
2020/0079245 A1 3/2020 Rowe et al.
2020/0088175 A1 3/2020 Li et al.
2020/0112269 A1 4/2020 Taghavi et al.
2020/0179168 A1 6/2020 Kelleher et al.
2020/0197250 A1 6/2020 Wyatt et al.
2020/0223325 A1 7/2020 Pinkelman et al.
2020/0226498 A1 7/2020 Jiwani et al.
2020/0238854 A1 7/2020 Gandhi et al.
2020/0247274 A1 8/2020 Gandhi et al.
2020/0276971 A1 9/2020 Takeda et al.
2020/0282878 A1 9/2020 Gandhi et al.
2020/0298732 A1 9/2020 Gandhi et al.
2020/0307416 A1 10/2020 Gandhi et al.
2020/0309102 A1 10/2020 Henderson et al.
2020/0339242 A1 10/2020 Tsuruta et al.
2020/0377036 A1 12/2020 Lee et al.
2020/0378370 A1 12/2020 Kopfer et al.
2021/0038467 A1 2/2021 Van Der Merwe et al.
2021/0095646 A1 4/2021 Blecha et al.
2021/0114553 A1 4/2021 Awtar et al.
2021/0118597 A1 4/2021 Pinkelman et al.
2021/0132396 A1 5/2021 Shin et al.
2021/0153754 A1 5/2021 Ozawa et al.
2021/0161755 A1 6/2021 Le et al.
2021/0162457 A1 6/2021 Eberfors
2021/0221269 A1 7/2021 Baranowski et al.
2021/0236061 A1 8/2021 Severgnini et al.
2021/0237631 A1 8/2021 Muck et al.
2021/0237809 A1 8/2021 Rowe et al.
2021/0265922 A1 8/2021 Nakagawa
2021/0284079 A1 9/2021 Rowe et al.
2021/0312169 A1 10/2021 Pham
2021/0369547 A1 12/2021 Mau et al.
2021/0370499 A1 12/2021 Rowe et al.
2022/0001530 A1 1/2022 Sameoto et al.
2022/0012458 A1 1/2022 Uetabira
2022/0015932 A1 1/2022 Rowe
2022/0015933 A1 1/2022 Rowe
2022/0015971 A1 1/2022 Rowe et al.
2022/0015977 A1 1/2022 Rowe et al.
2022/0017005 A1 1/2022 Rowe et al.
2022/0021314 A1 1/2022 Rowe et al.
2022/0031178 A1 2/2022 Brulet et al.
2022/0063087 A1 3/2022 Rowe
2022/0106941 A1 4/2022 Easton
2022/0119202 A1 4/2022 Morrissey et al.
2022/0154703 A1 5/2022 Shin et al.
2022/0164079 A1 5/2022 Severgnini et al.
2022/0166351 A1 5/2022 Rowe
2022/0176550 A1 6/2022 Rowe
2022/0176551 A1 6/2022 Rowe et al.
2022/0178414 A1 6/2022 Herzog et al.
2022/0196109 A1 6/2022 Gandhi et al.
2022/0196967 A1 6/2022 Dai et al.
2022/0232903 A1 7/2022 Rutledge et al.
2022/0239238 A1 7/2022 Rowe et al.
2022/0242328 A1 8/2022 Pinkelman et al.
2022/0258656 A1 8/2022 Little
2022/0299016 A1 9/2022 Tsuruta et al.
2022/0307485 A1 9/2022 Gummin et al.
2022/0313420 A1 10/2022 Rowe et al.
2022/0314857 A1 10/2022 Tsuruta et al.
2022/0315147 A1 10/2022 Palaniswamy et al.
2022/0316457 A1 10/2022 Rowe et al.
2022/0316458 A1 10/2022 Tsuruta et al.
2022/0321033 A1 10/2022 Rowe et al.
2022/0321034 A1 10/2022 Ebling et al.
2022/0371474 A1 11/2022 Kaku et al.
2022/0412325 A1 12/2022 Köpfer et al.
2023/0000715 A1 1/2023 Rowe
2023/0001572 A1 1/2023 Rowe et al.
2023/0078040 A1 3/2023 Rowe et al.
2023/0088911 A1 3/2023 Song et al.
2023/0119407 A1 4/2023 Sugiyama et al.
2023/0120436 A1 4/2023 Tsuruta et al.
2023/0124526 A1 4/2023 Tsuruta et al.
2023/0136197 A1 5/2023 Gilmore et al.
2023/0179122 A1 6/2023 Palaniswamy et al.
2023/0191953 A1 6/2023 Panwar et al.
2023/0193929 A1 6/2023 Rowe et al.

(56) References Cited

U.S. PATENT DOCUMENTS

| | | | |
|---|---|---|---|
| 2023/0287871 | A1 | 9/2023 | Rowe |
| 2023/0312109 | A1 | 10/2023 | Joshi et al. |
| 2023/0331371 | A1 | 10/2023 | Gupta et al. |
| 2023/0331372 | A1 | 10/2023 | Gupta et al. |
| 2023/0337827 | A1 | 10/2023 | Pinkelman et al. |
| 2024/0060480 | A1 | 2/2024 | Panwar et al. |
| 2024/0097666 | A1 | 3/2024 | Easton et al. |

FOREIGN PATENT DOCUMENTS

| | | | |
|---|---|---|---|
| CN | 101417152 | A | 4/2009 |
| CN | 102333504 | A | 1/2012 |
| CN | 102152309 | B | 11/2012 |
| CN | 103038094 | A | 4/2013 |
| CN | 103147511 | A | 6/2013 |
| CN | 102026842 | B | 7/2013 |
| CN | 103935495 | A | 7/2014 |
| CN | 102765354 | B | 11/2014 |
| CN | 104290617 | A | 1/2015 |
| CN | 204774820 | U | 11/2015 |
| CN | 105517664 | A | 4/2016 |
| CN | 106168523 | A | 11/2016 |
| CN | 107111473 | A | 1/2017 |
| CN | 206029888 | U | 3/2017 |
| CN | 106956254 | A | 7/2017 |
| CN | 105946515 | B | 4/2018 |
| CN | 108100228 | A | 6/2018 |
| CN | 108819806 | A | 11/2018 |
| CN | 106014897 | B | 12/2018 |
| CN | 106956254 | B | 3/2019 |
| CN | 109572966 | A | 4/2019 |
| CN | 209010975 | U | 6/2019 |
| CN | 105003405 | B | 7/2019 |
| CN | 107485536 | B | 1/2020 |
| CN | 112411375 | A | 2/2021 |
| CN | 113119155 | A | 7/2021 |
| CN | 115706489 | A | 2/2023 |
| DE | 19837829 | A1 | 2/2000 |
| DE | 10155119 | B4 | 5/2003 |
| DE | 20309196 | U1 | 11/2003 |
| DE | 10222022 | A1 | 12/2003 |
| DE | 102010021902 | A1 | 12/2011 |
| DE | 102016210214 | A1 | 12/2017 |
| DE | 102019204866 | A1 | 10/2020 |
| DE | 102008021679 | B4 | 1/2021 |
| EP | 1420094 | A1 | 5/2004 |
| EP | 1519055 | A2 | 3/2005 |
| EP | 1904337 | B1 | 10/2010 |
| EP | 2723069 | A1 | 4/2014 |
| EP | 3196484 | A1 | 7/2017 |
| EP | 3858562 | A1 | 8/2021 |
| FR | 3058108 | A1 | 5/2018 |
| JP | S5870892 | U | 5/1983 |
| JP | S61277898 | A | 12/1986 |
| JP | H03276698 | A | 12/1991 |
| JP | H06033895 | A | 6/1994 |
| JP | 09-133069 | A | 5/1997 |
| JP | H09168285 | A | 6/1997 |
| JP | H10337061 | A | 12/1998 |
| JP | 2001293267 | A | 10/2001 |
| JP | 2003276698 | A | 10/2003 |
| JP | 3706899 | B2 | 10/2005 |
| JP | 2006000347 | A | 1/2006 |
| JP | 2006006581 | A | 1/2006 |
| JP | 2006248456 | A | 9/2006 |
| JP | 2008014470 | A | 1/2008 |
| JP | 2008138558 | A | 6/2008 |
| JP | 2008154447 | A | 7/2008 |
| JP | 4273902 | B2 | 6/2009 |
| JP | 2009162233 | A | 7/2009 |
| JP | 2010117457 | A | 5/2010 |
| JP | 4576281 | B2 | 11/2010 |
| JP | 5760241 | | 8/2015 |
| JP | 2017175155 | A | 9/2017 |
| JP | 2018188035 | A | 11/2018 |
| JP | 2019094789 | A | 6/2019 |
| JP | 2019101988 | A | 6/2019 |
| JP | 2019-113578 | A | 7/2019 |
| JP | 2020090181 | A | 6/2020 |
| JP | 2021107221 | A | 7/2021 |
| KR | 19980044089 | U | 9/1998 |
| KR | 20050056526 | A | 6/2005 |
| KR | 1020130005989 | | 1/2013 |
| KR | 101395364 | B1 | 5/2014 |
| KR | 101483560 | B1 | 1/2015 |
| KR | 20170070675 | A | 6/2017 |
| KR | 101861620 | B1 | 4/2018 |
| KR | 1020180074003 | A | 7/2018 |
| KR | 101931791 | B1 | 12/2018 |
| KR | 20210052091 | A | 5/2021 |
| KR | 20210086518 | A | 7/2021 |
| KR | 102298464 | B1 | 9/2021 |
| WO | 9325267 | A1 | 12/1993 |
| WO | 02011648 | A1 | 2/2002 |
| WO | 2005004321 | A1 | 1/2005 |
| WO | 2009079668 | A2 | 6/2009 |
| WO | 2009111362 | A2 | 9/2009 |
| WO | 2011017071 | A2 | 2/2011 |
| WO | 2011111769 | A1 | 9/2011 |
| WO | 2014145018 | A2 | 9/2014 |
| WO | 2014172320 | A1 | 10/2014 |
| WO | 2014191361 | A1 | 12/2014 |
| WO | 2015037600 | A1 | 3/2015 |
| WO | 2015051380 | A2 | 4/2015 |
| WO | 2016017057 | A1 | 2/2016 |
| WO | 2016130719 | A2 | 8/2016 |
| WO | 2017077541 | A1 | 5/2017 |
| WO | 2018080465 | A1 | 5/2018 |
| WO | 2018175741 | A1 | 9/2018 |
| WO | 2019043599 | A1 | 3/2019 |
| WO | 2019097437 | A1 | 5/2019 |
| WO | 2019137048 | A1 | 7/2019 |
| WO | 2019173227 | A1 | 9/2019 |
| WO | 2020110091 | A2 | 6/2020 |
| WO | 2020183360 | A1 | 9/2020 |
| WO | 2020244794 | A1 | 12/2020 |
| WO | 2021118185 | A2 | 6/2021 |
| WO | 2022258952 | A1 | 12/2022 |

OTHER PUBLICATIONS

"HapWRAP: Soft Growing Wearable Haptic Device", retrieved from the Internet: <https://smartdevicess.createdsites.com>, dated May 27, 2019 (18 pages).

Yilmaz et al., "Detecting Vital Signs with Wearable Wireless Sensors", Sensors, Dec. 2010 (26 pages).

Choi et al. "Highly conductive, stretchable, and biocompatible Ag—Au core-sheath nanowire composite for wearable and implantable bioelectronics", Nature Nanotechnology 13, No. 11, 2018 (36 pages).

Gao et al., "Wearable Microfluidic Diaphragm Pressure Sensor for Health and Tactile Touch Monitoring", Advanced Materials, Oct. 2017 (15 pages).

Kweon et al., "Wearable high-performance pressure sensors based on three-dimensional electrospun conductive nanofibers", NPG Asia Materials 2018 (12 pages).

Wang et al. "Monitoring of the central blood pressure waveform via a conformal ultrasonic device", Nat Biomed Eng, Sep. 2018 (22 pages).

Agharese et al. "hapWRAP: Soft Growing Wearable Haptic Device", 2018 IEEE International Conference on Robotics and Automation (ICRA), May 2018 (7 pages).

Gao et al., "Fully integrated wearable sensor arrays for multiplexed in situ perspiration analysis", Nature, Jan. 2016 (30 pages).

Jitosho et al. "Exploiting Bistability for High Force Density Reflexive Gripping", 2019 International Conference on Robotics and Automation (ICRA), May 2019 (7 pages).

Wikipedia, "Slap bracelet", retrieved from the Internet: <https://en.wikipedia.org/wiki/Slap_bracelet>, [retrieved Mar. 12, 2021] (2 pages).

(56) References Cited

OTHER PUBLICATIONS

Maffiodo et al. "Three-Fingered Gripper with Flexure Hinges Actuated by Shape Memory Alloy Wires", Int. J. of Automation Technology, vol. 11, No. 3, pp. 355-360, 2017 (6 pages).
Buckner et al. "Roboticizing fabric by integrating functional fibers", Proceedings of the National Academy of Sciences, Oct. 2020 (10 pages).
Blain, "Refrigerants not required: Flexible metal cooling prototype demonstrates extreme efficiency", retrieved from the Internet: <https://newatlas.com/shape-memory-alloy-nitinol-heating-cooling/58837/> [retrieved Apr. 1, 2024], dated Mar. 13, 2019 (13 pages).
Taniguchi, "Flexible Artificial Muscle Actuator Using Coiled Shape Memory Alloy Wires", APCBEE Procedia 7, pp. 54-59, May 2013 (6 pages).
Acome et al., "Hydraulically amplified self-healing electrostatic actuators with muscle-like performance", Science 359, pp. 61-65, 2018 (5 pages).
Wang et al., "Recent Progress in Artificial Muscles for Interactive Soft Robotics", Advanced Materials, vol. 33, Issue 19, published Oct. 27, 2020 (48 pages).
Liang et al., "Comparative study of robotic artificial actuators and biological muscle", Advances in Mechanical Engineering, 2020 (25 pages).
El-Atab et al., "Soft Actuators for Soft Robotic Applications: A Review", Advanced Intelligent Systems 2020 (37 pages).
Pagoli et al., "Review of soft fluidic actuators: classification and materials modeling analysis", Smart Materials and Structures, vol. 31, 2021 (31 pages).
Park et al., "A Novel Fabric Muscle Based on Shape Memory Alloy Springs", Soft Robotics, vol. 7, No. 3, 2020 (11 pages).
Ebay, "Cardboard Dividers 5 Sets 7.5"×10.5"×4" High 12 cell", retrieved from the Internet: <https://www.ebay.comitm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).
Cazottes et al., "Bistable Buckled Beam: Modeling of Actuating Force and Experimental Validations", Journal of Mechanical Design, 2009 (10 pages).
Cazottes et al., "Design of Actuation for Bistable Structures Using Smart Materials," Advances in Science and Technology, vol. 54, pp. 287-292, 2008 (1st Page/Abstract only).
Cazottes et al, "Actuation of bistable buckled beams with Macro-Fiber Composites," IEEE/RSJ International Conference on Intelligent Robots and Systems, pp. 564-569, 2008 (7 pages).
Haines et al., "New Twist on Artificial Muscles," Proceedings of the National Academy of Sciences, vol. 113, No. 42, pp. 11709-11716, Oct. 18, 2016 (9 pages).
Inoue et al., "High-performance structure of a coil-shaped soft-actuator consisting of polymer threads and carbon nanotube yarns," AIP Advances 8, 2018, (8 pages).
Abbas et al., "A Physics Based Model for Twisted and Coiled Actuator" 2017 IEEE International Conference on Robotics and Automation (ICRA), pp. 6121-6126, 2017 (6 pages).
Haines et al., "Artificial Muscles from Fishing Line and Sewing Thread" (Supplementary Materials) Science 343, 868, 2014 (36 pages).
Yip et al., "On the Control and Properties of Supercoiled Polymer Artificial Muscles," IEEE Transactions on Robotics 2017 (11 pages).
alibaba.com, "Hangzhou Phase Change Technology Co., Ltd", Retrieved from the Internet: <https://hzfeijie.en.alibaba.com/product/1448845650-220286736/phase_change_material_PCM_balls.html#!>, [Retrieved May 2, 2017] (3 pages).
Goodfellow Corporation, "New to Our Range: A Magnetic Shape Memory Alloy that Converts Magnetic Field Energy into Kinetic Energy," <retrieved from the Internet: http://www.goodfellowusa.com/corporate/news/US/June-2011/us.htm> [retrieved Jan. 23, 2012] (2 pages).
Goodfellow Corporation, "Magnetic Shape Memory Material", <retrieved from the Internet: http://www.goodfellowusa.com/larger-quantities/alloys/magnetic-shape-memory-material/> [retrieved Jan. 23, 2012] (3 pages).
Sherrit et al., "Planar Rotary Motor using Ultrasonic Horns", Proc. SPIE 7981, Sensors and Smart Structures Technologies for Civil, Mechanical, and Aerospace Systems 2011, 79810O, Apr. 13, 2011 (8 pages).
Henry, "Dynamic Actuation Properties of Ni—Mn—Ga Ferromagnetic Shape Memory Alloys", submitted to the Massachusetts Institute of Technology Department of Materials Science and Engineering on May 22, 2002, images on pp. 64-66 (202 pages).
Zhu et al., U.S. Appl. No. 18/433,896, filed Feb. 6, 2024.
Rowe et al., U.S. Appl. No. 18/468,029, filed Sep. 15, 2023.
Rowe et al., U.S. Appl. No. 18/399,026, filed Dec. 28, 2023.
Rowe et al., U.S. Appl. No. 18/178,302, filed Mar. 3, 2023.
Lee et al. "Long Shape Memory Alloy Tendon-based Soft Robotic Actuators and Implementation as a Soft Gripper" Scientific Reports, Aug. 2, 2019 (12 pages).
Saga et al. "Development of artificial muscle actuator reinforced by Kevlar fiber", 2002 IEEE International Conference on Industrial Technology, Jan. 2002 (5 pages).
Rowe et al., U.S. Appl. No. 18/329,217, filed Jun. 5, 2023.
Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/452,734, filed Aug. 21, 2023.
Rowe et al., U.S. Appl. No. 18/453,395, filed Aug. 22, 2023.
Rowe et al., U.S. Appl. No. 18/452,602, filed Aug. 21, 2023.
Williams et al., U.S. Appl. No. 18/738,516, filed Jun. 10, 2024.
Zhu et al., U.S. Appl. No. 18/172,637, filed Feb. 22, 2023.
Rowe et al., U.S. Appl. No. 63/623,930, filed Jan. 23, 2024.
Song et al., "Resistance Modelling of SMA Wire Actuators", Canadian Institute for NDE, International Workshop: Smart Materials, Structures & NDT in Aerospace Conference, Nov. 2011 (10 pages).
Motzki, "Efficient SMA Actuation—Design and Control Concepts", Proceedings, vol. 64, No. 1, MDPI, 2020 (9 pages).
Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).
Spiess, "#321 7 Sensors tested: Measuring Current with Microcontrollers (Arduino, ESP32, ESP8266)", uploaded on Apr. 5, 2020 by user "Andreas Spiess" accessible via the Internet: < https://www.youtube.com/watch?v=cG8moaufmQs>.
Jani et al., "A review of shape memory alloy research, applications, and opportunities", Elsevier, 2014, pp. 1078-1113 (36 pages).
Tiseo et al., "A Shape Memory Alloy Based Tuneable Dynamic Vibration Absorber for Vibration Tonal Control", Journal of Theoretical and Applied Mechanics, 2010, pp. 135-153 (19 pages).
Williams et al., "Dynamic modelling of a shape memory alloy adaptive tuned vibration absorber", Elsevier, Journal of Vibration and Sound, 2005, pp. 211-234 (24 pages).
Araki et al., "Integrated mechanical and material design of quasi-zero-stiffness vibration isolator with superelastic Cu—Al—Mn shape memory alloy bars", Journal of Sound and Vibration, 2015 (34 pages).
Casciati et al., "Performance of a base isolator with shape memory alloy bars", Earthquake Engineering and Engineering Vibration, Dec. 2007 (8 pages).
Correa et al., "Mechanical Design of Negative Stiffness Honeycomb Materials", Integrating Materials and Manufacturing Innovation, 4:10, pp. 1-11, 2015 (11 pages).
Ferguson-Pell, "Seat Cushion Selection", J. Rehab. Res. Dev., Special Supplement #2, 23(3), pp. 49-73, 1986 (25 pages).
Miga Motor Company, "Miga Adrenaline—A Space Age Wire," retrieved from the Internet: <https://migamotors.com/index.php?main_page=product_info&cPath=1&products_id=37>, [retrieved Mar. 26, 2021] (1 page).
Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).

(56) References Cited

OTHER PUBLICATIONS

Edragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production—Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Rowe et al., U.S. Appl. No. 63/485,398, filed Feb. 16, 2023.
Pinkelman et al., U.S. Appl. No. 17/729,522, filed Apr. 26, 2022.
Ou et al., "jamSheets: Thin Interfaces with Tunable Stiffness Enabled by Layer Jamming," Proceedings of the 8th International Conference on Tangible, Embedded, and Embodied Interaction, 2014 (8 pages).
Ou et al., "aeroMorph—Heat-sealing Inflatable Shape-change Materials for Interaction Design," Proceedings of the 29th Annual Symposium on User Interface Software and Technology (2016) pp. 121-132 (10 pages).
Zhu et al., U.S. Appl. No. 18/399,075, filed Dec. 28, 2023.
Wikipedia contributors. (Oct. 16, 2022). Swaged sleeve. In Wikipedia, The Free Encyclopedia. Retrieved 14:36, Aug. 14, 2025, from https://en.wikipedia.org/w/index.php?title=Swaged_sleeve&oldid=1116368722 (Year: 2022), (2 pages).
Wu et al., "Effect of Polyurethane Coating on Mechanical Response of Shape Memory Alloy Wires." Smart Materials and Structures, IOP Science, Sep. 14, 2023, iopscience.iop.org/article/10.1088/1361-665X/acf69c. Accessed Nov. 21, 2025 (11 pages).
JZK "JZK 2 Mm X 30 M 98 Ft Plastic-Coated Thin Stainless Steel Wire Rope Cable: Amazon.de: Business, Industry & Science." Amazon.de, Nov. 11, 2020, www.amazon.de/-/en/Plastic-Coated-Stainless-Sleeves-Picture-Hanging/dp/B08N6837B9. Ace (Year: 2020) (6 pages).

* cited by examiner

CONTRACTING MEMBER POSITION CONTROL AND/OR STATE MONITORING

FIELD

The subject matter described herein relates in general to actuators and, more particularly, to contracting member-based actuators.

BACKGROUND

Some motor vehicles have actuators in one or more portions of a vehicle seat. These actuators can provide a haptic effect to a seat occupant. Such an effect can provide support and/or comfort to a seat occupant.

SUMMARY

In one respect, the present disclosure is directed to a system. The system can include an actuator configured to morph, when activated, into an activated configuration in which a dimension of the actuator increases. The actuator can include a contracting member. The system can include a sensor configured to acquire sensor data. The contracting member can operatively engage the sensor. The sensor can include a strain gauge. The system can include one or more processors operatively connected to monitor a state of the contracting member based on the sensor data.

In another respect, the present disclosure is directed to a method of monitoring a state of a contracting member used in an actuator. The contracting member can operatively engage a sensor. The sensor can be a strain gauge. The method can include causing the actuator to morph into an activated configuration. The method can include monitoring a state of the contracting member using sensor data acquired by the sensor. The method can include controlling an activated state of the actuator based on the acquired sensor data.

DETAILED DESCRIPTION

Some actuators used in vehicles use shape memory alloys for actuation. Shape memory alloys can be prone to overstress and/or overheating, which can lead to a reduced life and/or effectiveness of the actuators. Further, shape memory alloy actuators typically operate between a non-activated state and a fully actuated state based on the supply of electric power. Attempts to control the position of a shape memory alloy actuator using model-based estimation have not delivered consistent results.

Accordingly, arrangements described herein are directed to monitoring the state of a contracting member and/or position control of a contracting member-based actuator. Such monitoring and/or controlling can be based on sensor data from a sensor (e.g., a strain gauge) that is operatively engaged by the contracting member.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

Figure 1:
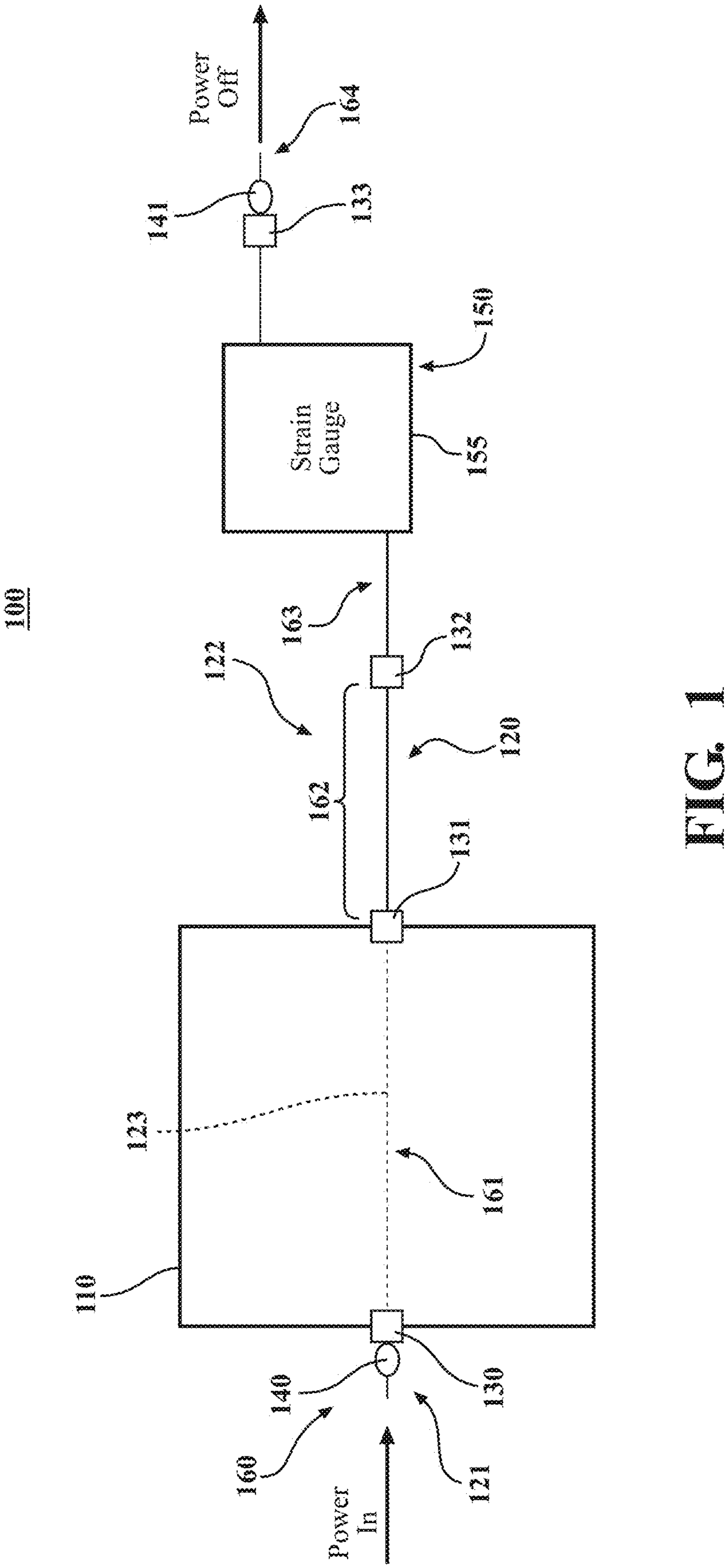
FIG. 1 shows an example of a system for contracting member position control and/or state monitoring.

FIG. 1 shows an example of a system 100 for contracting member position control and/or monitoring. The system 100 can include an actuator 110. The actuator 110 is represented generally as there are various suitable actuators that can work with arrangements herein. When activated, the actuator is configured to morph into an activated configuration in which a dimension (e.g., a height) of the actuator increases.

The actuator 110 can include one or more contracting members. The contracting member(s) can be any structure that, when activated, is configured to shrink in at least one dimension (e.g., length). In one or more arrangements, the contracting member(s) can be one or more shape memory material members 120, one or more active material members, or one or more memory material members. For convenience, the following description will be made in connection with the contracting member being a shape memory material member 120. However, it will be understood that the contracting member is not limited to being a shape memory material member.

When an activation input is provided to the shape memory material member 120, the shape memory material member 120 can contract, thereby causing the actuator to morph into an activated configuration in which a dimension height of the actuator increases. In some arrangements, the contracting member can be a shape memory material member, which can include shape memory alloys and shape memory polymers. As an example, the contracting member can be a shape memory alloy wire. Various non-limiting examples of suitable actuators are shown in FIGS. 7-11, and they will be described in greater detail herein.

The phrase "shape memory material" includes materials that change shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members can be shape memory material wires. As an example, the shape memory material members can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration. Of course, it will be appreciated that the activation input can be provided to the shape memory alloy wire(s) in other ways. For example, heated air can be blown on the shape memory alloy wire(s).

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 150 MPa to about 400 MPa. The wire(s) can be configured to provide an initial moment of from about 300 to about 600 N mm, or greater than about 500 N mm, where the unit of newton millimeter (N mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members to be moved from non-activated position to an activated position in about 3 seconds or less, about 2 seconds or less, about 1 second or less, or about 0.5 seconds or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynalloy, Inc., Irvine, California. As a further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature $T_{SMA}$. Utilization of the intrinsic property of SMA wires can be accomplished by using heat, for example, via the passing of an electric current through the SMA wire in order to provide heat generated by electrical resistance, in order to change a phase or crystal structure transformation (i.e., twinned martensite, detwinned martensite, and austenite) resulting in a lengthening or shortening of the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

The SMA wire can have a critical temperature. Once the critical temperature is reached, the SMA wire cannot produce any more force. Thus, if the SMA wire is heated above the critical temperature, it cannot produce any more force. This inherent property of the SMA wire can be leveraged according to arrangements described herein.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material members are described, in some implementations, as being wires, it will be understood that the shape memory material members are not limited to being wires. Indeed, it is envisioned that suitable shape memory materials may be employed in a variety of other forms, such as sheets, plates, panels, strips, cables, tubes, or combinations thereof. In some arrangements, the shape memory material members may include an insulating coating.

In some arrangements, the actuator 110 can include a single shape memory material member 120. In some instances, one or more portions of the shape memory material member 120 can extend external to the overall envelope of the actuator 110. For instance, the shape memory material member 120 can include a first external portion 121 and a second external portion 122. Further, a portion of the shape memory material member 120 can extend within the actuator 110. Thus, the shape memory material member 120 can include an internal portion 123.

One example of the routing of the shape memory material member 120 will now be described with respect to FIG. 1. Beginning on the left side of FIG. 1, there can be the first external portion 121 of the shape memory material member 120. The shape memory material member 120 can then be routed with respect to the actuator 110. For instance, in some arrangements, the shape memory material member 120 can extend substantially linearly within the actuator 110. In other arrangements, the shape memory material member 120 can extend in a non-linear manner, such as in a serpentine or a zig-zag arrangement. The shape memory material member 120 can exit the actuator 110. This portion is the second external portion 122. In the second external portion 122, the shape memory material member 120 can operatively engage a sensor 150, as will be described in more detail in FIGS. 2-3. The sensor 150 can be a strain gauge 155.

The shape memory material member 120 can be activated and/or deactivated using any suitable form of energy and/or from any suitable source. For example, in some arrangements, the shape memory material member 120 can be operatively connected to a power source (e.g., the power source(s) 440 in FIG. 4). In one or more arrangements, the first external portion 121 can be operatively connected to receive electrical energy (e.g., power in). For instance, the shape memory material member 120 can be operatively connected to a power source at an electrical connection 140. In one or more arrangements, the second external portion 122 can be operatively connected for electrical energy to exit the system 100 (e.g., power out). For instance, the shape memory material member 120 can be operatively connected to a power source at electrical connection 141.

However, it will be appreciated that arrangements described herein are not limited to activating and/or deactivating the shape memory material member 120 based on electrical energy. Indeed, as an example, the shape memory material member 120 can be activated and/or deactivated by supplying hot air or discontinuing a supply of hot air, such as from a heater or some other heat source, to the shape memory material member 120. The heater can be operatively positioned with respect to the shape memory material member 120.

The shape memory material member can have a plurality of mechanically isolated zones. Each of the mechanically isolated zones does not affect the other mechanically isolated zones. The shape memory material member can be electrically connected throughout its routing. However, if the shape memory material member contracts or expands, then such contraction or expansion occurs through all of the mechanically isolated zones.

The mechanically isolated zones can be defined by a plurality of isolation points. In the example shown in FIG. 1, there can be four isolation points, including a first isolation point 130, a second isolation point 131, a third isolation point 132, and a fourth isolation point 133. The isolation points 130, 131, 132, 133 can be defined in any suitable manner. For instance, the isolation points 130, 131, 132, 133 can be locations where the shape memory material member 120 is crimped. For example, a crimp body can be crushed or deformed about the shape memory material member 120. Some examples of such an arrangement are described in U.S. patent application Ser. No. 18/468,029, which is incorporated herein by reference in its entirety.

The isolation points 130, 131, 132, 133 can create a plurality of mechanically isolated zones, including a first mechanically isolated zone 160, a second mechanically isolated zone 161, a third mechanically isolated zone 162, a fourth mechanically isolated zone 163, and a fifth mechanically isolated zone 164. Each of these mechanically isolated zones will be described in turn below.

The first mechanically isolated zone 160 can be defined by the first isolation point 130. The first mechanically isolated zone can include the first external portion 121 of the shape memory material member 120. The first isolation point 130 can be located at or near where the shape memory material member 120 enters the actuator.

The second mechanically isolated zone 161 can be defined between the first isolation point 130 and the second isolation point 131. The second mechanically isolated zone 161 can be largely, if not entirely, defined by the portion of the shape memory material member 120 routed within the actuator 110.

The third mechanically isolated zone 162 can be defined between the second isolation point 131 and the third isolation point 132. The third mechanically isolated zone 162 can be a free floating zone where the shape memory material member 120 does not engage another structure.

The fourth mechanically isolated zone 163 can be defined between the third isolation point 132 and the fourth isolation point 133. The fourth mechanically isolated zone 163 can be monitored by one or more sensors. The fourth mechanically isolated zone 163 can be where the shape memory material member 120 operatively engages the sensor 150. Additional details of this area will be described in greater detail with FIGS. 2-3.

The fifth mechanically isolated zone 164 can be defined by the fourth isolation point 133 and beyond. The fifth mechanically isolated zone 164 can include the second external portion 122 of the shape memory material member 120. The fourth isolation point 133 can be located at or near where the shape memory material member 120 exits the actuator 110.

Figure 2:
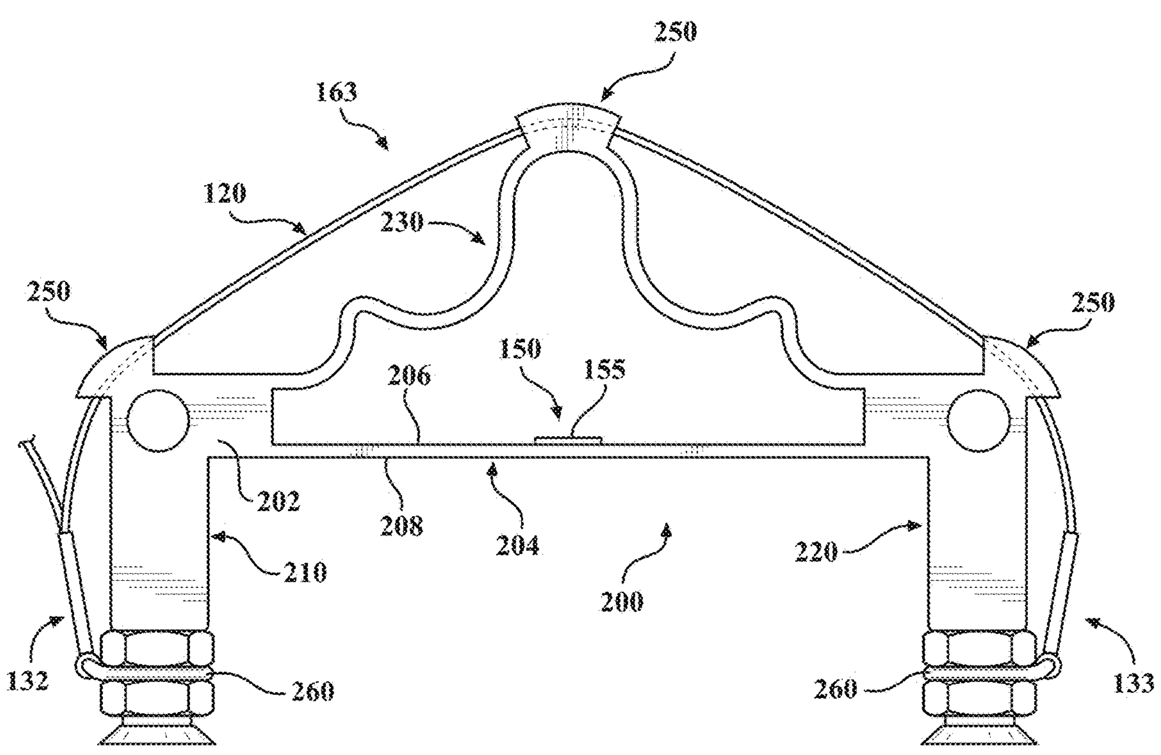
FIG. 2 is a close-up of a portion of the system of FIG. 1, showing a non-activated configuration.
Figure 3:
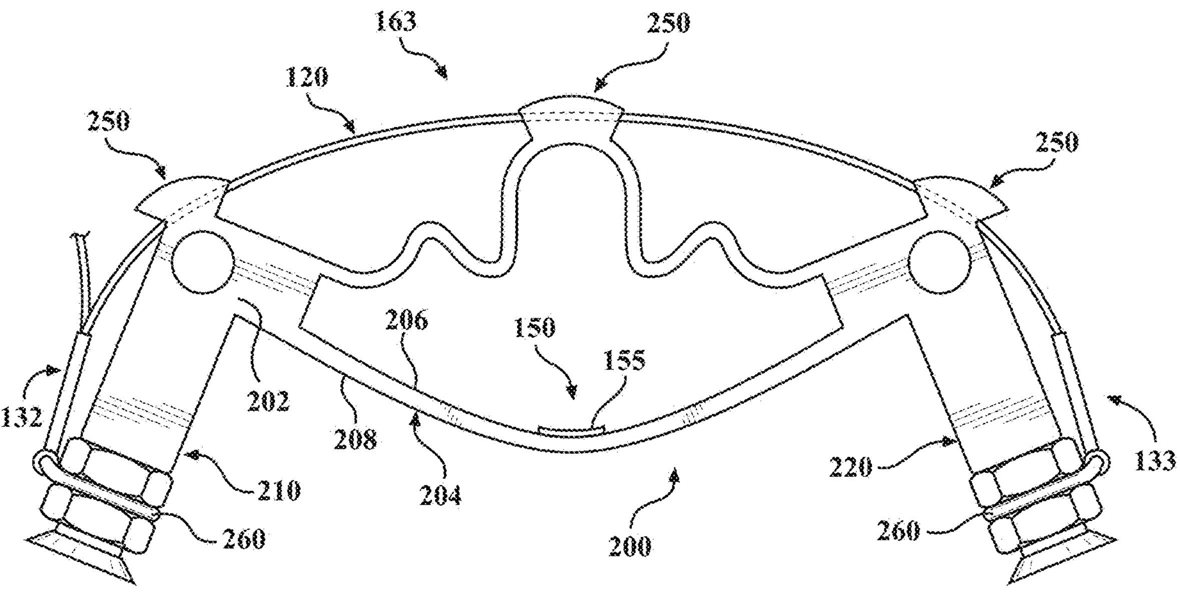
FIG. 3 is a close-up of a portion of the system of FIG. 1, showing an activated configuration.

Referring to FIGS. 2-3, a close-up of a portion of the system 100 of FIG. 1 is shown. In particular, an example of the operative engagement between the sensor 150 and the shape memory material member 120 is shown. "Operative engagement" refers to an arrangement in which the activation and/or deactivation of the shape memory material member affects the sensor 150. "Operative engagement" can include direct contact and/or indirect contact between the shape memory material member and the sensor 150, including connections without direct physical contact.

The sensor 150 can be a strain gauge 155. The strain gauge 155 can be any suitable type of strain gauge, now known or later developed. The strain gauge 155 can be configured to vary its output signal (e.g., resistance) with applied force. More particularly, the strain gauge 155 can convert an applied force, pressure, tension, weight, etc., into a change in electrical resistance which can then be measured. The strain gauge 155 can be a relatively thin and/or substantially flat structure.

In some arrangements, the strain gauge 155 can be used in connection with another structure. In this example, the strain gauge 155 can be used in connection with a spring structure 200. The spring structure 200 can have any suitable configuration, and it will be understood that the configuration of the spring structure 200 shown in FIGS. 2-3 is merely one example. The spring structure 200 can have any suitable configuration to enable or facilitate a spring effect. The spring structure 200 can be made of any suitable material, such as spring steel. The spring structure 200 can have an associated spring constant. The spring structure 200 can be configured to provide a desired level of response when the contracting member applies force(s) to it. The spring structure 200 can be formed in any suitable way, such as by three dimensional printing.

The spring structure 200 can have a body 202. The body 202 can include a beam portion 204. The beam portion 204 can be a relatively thin structure that is flexible such that it can flex or bow when a force is applied to it. The beam portion 204 can be formed as a unitary structure with the body 202. Alternatively, the beam portion 204 can be a separate structure that is operatively connected to the body 202.

The beam portion 204 can have an upper surface 206 and a lower surface 208. The upper surface 206 and the lower surface 208 can be substantially planar. The upper surface 206 and the lower surface 208 can be substantially parallel to each other.

The strain gauge 155 can be operatively connected to the beam portion 204. For example, the strain gauge 155 can be operatively connected to the beam portion 204 by one or more fasteners, one or more adhesives, one or more forms of mechanical engagement, or any combination thereof, just to name a few possibilities. The strain gauge 155 can be operatively connected in any suitable location on the beam portion 204. In one or more arrangements, the strain gauge 155 can be operatively connected to the upper surface 206 of the beam portion 204. In one or more arrangements, the strain gauge 155 can be operatively connected in a substantially central location on the beam portion 204. The strain gauge 155 can be operatively positioned to be aligned with a bowing direction of the beam portion 204.

The spring structure 200 can include a first leg 210 and a second leg 220. The first leg 210 and the second leg 220 can be spaced apart. In some arrangements, the first leg 210 and the second leg 220 can be substantially parallel to each other.

The spring structure 200 can include a spring portion 230. The spring portion 230 can be configured to compress, stretch, or deform when the spring structure 200 is subject to forces. The spring portion 230 can bias the spring structure 200 into the non-activated configuration of FIG. 2. The spring portion 230 can have any suitable configuration. In some arrangements, the spring portion 230 can be formed by a plurality of bends in the body 202.

The shape memory material member 120 can operatively engage the spring structure 200 in any suitable manner. The shape memory material member 120 can operatively engage the spring structure 200 such that, when activated, the shape memory material member 120 can cause the spring structure 200 to deform.

Thus, when the shape memory material member 120 contracts in response to an activation input, it can exert a force on the spring structure 200, thereby causing the spring structure 200 to deform. The deformation of the body 202 of the spring structure 200 can cause the beam portion 204 to deform (e.g., bending, bowing, flexing, deflecting, etc.), as is shown in FIG. 3. The deformation of the beam portion 204 can exert force, pressure, or mechanical stress on the strain gauge 155. A sensor signal output (e.g., resistance) of the strain gauge 155 can change when a force, pressure, or mechanical stress is applied. The resistance can depend on how much force, pressure, or mechanical stress is applied. The resistance can be proportional to the force, pressure, or mechanical stress being applied to it. It will be appreciated that the design of the spring structure 200 can linearize the output signals of the strain gauge 155 when the shape memory material member 120 deforms the spring structure 200.

Thus, the spring structure 200 can go from a neutral or non-activated configuration (FIG. 2) to a deformed configuration (FIG. 3). When deactivated, the shape memory material member 120 can relax, and the spring structure 200 can substantially return to the neutral configuration under the bias of the spring portion 230.

The shape memory material member 120 can operatively engage the spring structure 200 in any suitable manner. In one or more arrangements, the shape memory material member 120 can be wrapped around at least a portion of the spring structure 200. One non-limiting example is shown in FIGS. 2-3 in which the shape memory material member 120 is wrapped about a portion of the spring structure 200. However, it will be appreciated that the shape memory material member 120 can be wrapped about the spring structure 200 at least one time.

Beginning at the left side of FIGS. 2-3, the shape memory material member 120 can be operatively connected to a portion of the spring structure 200 (e.g., a first leg 210). The operative connection of the shape memory material member 120 to the first portion of the spring structure 200 (e.g., the first leg 210) can define the third isolation point 132. In some arrangements, a crimp body can be deformed about the shape memory material member 120. The crimp body can be operatively connected to the first leg 210 by one or more fasteners, such as an eyelet 260.

From there, the shape memory material member 120 can pass over the top of the spring structure 200. The shape memory material member 120 can pass over the spring portion 230.

The shape memory material member 120 can be operatively connected to another portion of the spring structure 200 (e.g., a second leg 220). The operative connection of the shape memory material member 120 to the second portion of the spring structure 200 (e.g., the second leg 220) can define the fourth isolation point 133. In some arrangements, a crimp body can be deformed about the shape memory material member 120. The crimp body can be operatively connected to the second leg 220 by one or more fasteners, such as an eyelet 260.

Of course, the above-described routing of the shape memory material member 120 is merely one example, and various other ways of routing the shape memory material member 120 are possible. It will be appreciated that FIGS. 2-3 can reflect the fourth mechanically isolated zone 163.

The spring structure 200 can provide one or more guide structures 250 to facilitate the routing of the shape memory material member 120. The guide structures 250 can help to keep the shape memory material member 120 in place when activated and deactivated. The guide structures 250 can have any suitable configuration. In some arrangements, the guide structure 250 can be formed as a unitary structure with the body 202. Alternatively, the guide structures 250 can be a separate structure that is operatively connected to the body 202. In some arrangements, the guide structures 250 can include an aperture through which the shape memory material member 120 can be received. In some arrangements, the guide structures 250 can include a recess into which the shape memory material member 120 can be received.

FIG. 2 shows an example of a non-activated condition of the shape memory material member 120. The spring structure 200 is in an initial or neutral configuration. The beam portion 204 can extend substantially linearly.

FIG. 3 shows an example of an activated condition of the shape memory material member 120. An activation input has been provided to the shape memory material member 120. As a result, the shape memory material member 120 heats up. When the shape memory material member 120 reaches or exceeds its activation temperature, the shape memory material member 120 can shrink. The shrinking of the shape memory material member 120 can cause the spring structure 200 to deform.

One example of the deformation of the spring structure 200 is shown in FIG. 3. The upper portions of the first leg 210 and the second leg 220 can move toward each other. Such movements can be accommodated by the deformation of the spring portion 230. The beam portion 204 can deform as well. In the example shown, the beam portion 204 can become bowed. As a result, it will be appreciated that such bowing can affect the signal output of the strain gauge 155. The output signal of the strain gauge 155 can be used to determine the state of the shape memory material member 120, such as the degree of activation of the shape memory material member 120.

As noted above, when the shape memory material member 120 is activated, it can shrink in length. However, the shape memory material member 120 can be kept in position relative to the spring structure 200 by the guide structures 250.

When the shape memory material member 120 is deactivated, it can expand in length. Thus, as the shape memory material member 120 expands, the spring structure 200 can substantially return to its initial configuration (FIG. 2) under its own bias.

Figure 4:
FIG. 4 is an example of a system for contracting member position control and/or state monitoring.
Figure 4:
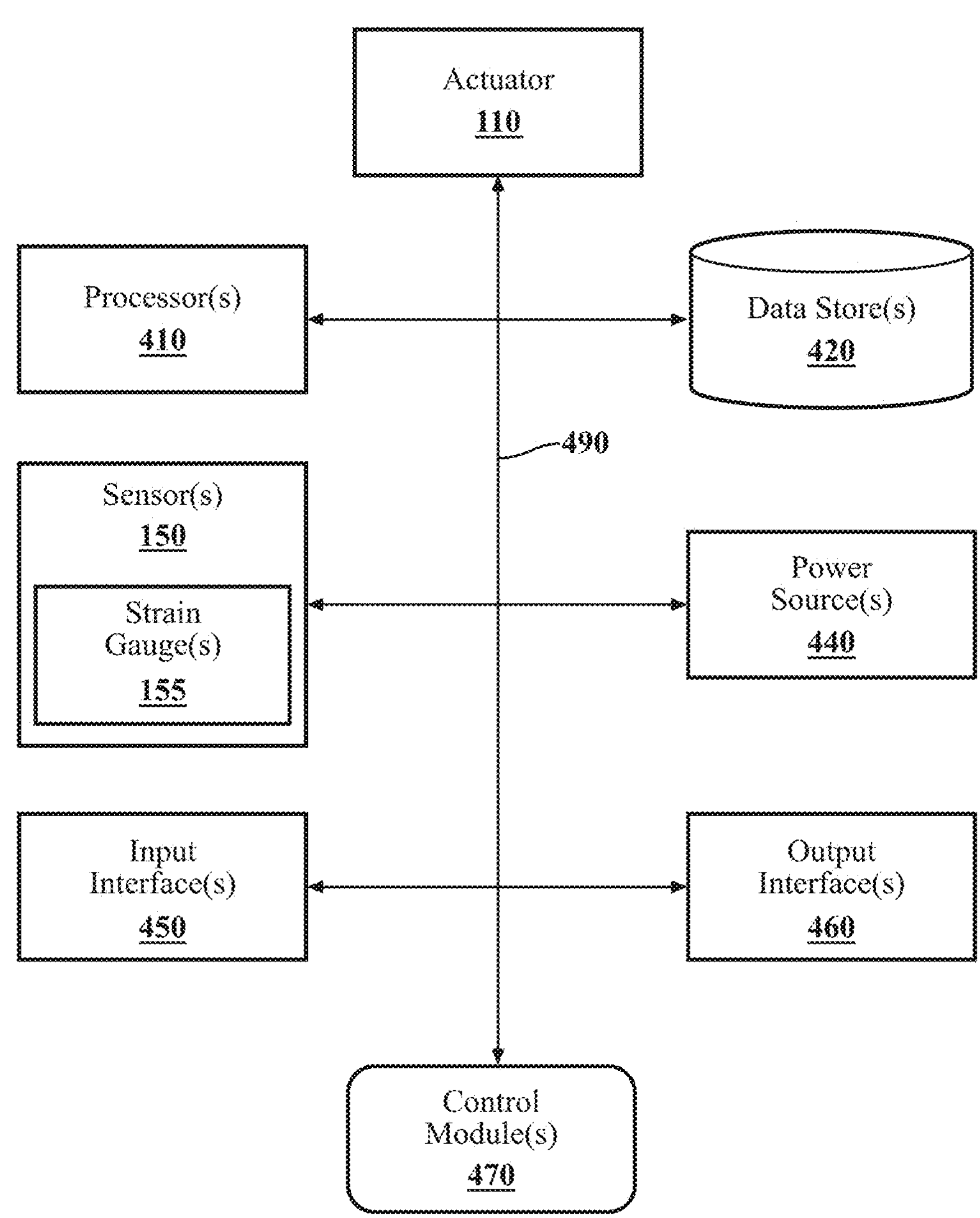

Referring to FIG. 4, an example of a system 400 for position control and/or state monitoring of a contracting member is shown. The system 400 can include various elements. Some of the possible elements of the system 400 are shown in FIG. 4 and will now be described. It will be understood that it is not necessary for the system 400 to have all of the elements shown in FIG. 4 or described herein. The system 400 can have any combination of the various elements shown in FIG. 4. Further, the system 400 can have additional elements to those shown in FIG. 4. In some arrangements, the system 400 may not include one or more of the elements shown in FIG. 4. Further, the elements shown may be physically separated by large distances. Indeed, one or more of the elements can be located remotely from the other elements, such as on a remote server or cloud-based server.

In addition to the actuator 110, the system 400 can include one or more processors 410, one or more data stores 420, one or more sensors 150, one or more power sources 440, one or more input interfaces 450, one or more output interfaces 460, and/or one or more control modules 470. Each of these elements will be described in turn below.

As noted above, the system 400 can include one or more processors 410. "Processor" means any component or group of components that are configured to execute any of the processes described herein or any form of instructions to carry out such processes or cause such processes to be performed. The processor(s) 410 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 410 can include at least one hardware circuit (e.g., an integrated circuit) configured to carry out instructions contained in program code. In arrangements in which there is a plurality of processors 410, such processors can work independently from each other or one or more processors can work in combination with each other.

The system 400 can include one or more data stores 420 for storing one or more types of data. The data store(s) 420 can include volatile and/or non-volatile memory. Examples of suitable data stores 420 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 420 can be a component of the processor(s) 410, or the data store(s) 420 can be operatively connected to the processor(s) 410 for use thereby. The term "operatively connected," as used throughout this description, can include direct or indirect connections, including connections without direct physical contact.

In some arrangements, the data store(s) 420 can store shape memory material data about one or more shape memory material members. As an example, the data store(s) 420 can store stress-strain curves for one or more shape memory material members, such as any of those used in the system 100. For each shape memory material member, the stress-strain curves can show the performance of the respective shape memory material member. Further, the data store(s) 420 can include strain values associated with different levels of actuation of the shape memory material member(s). For instance, there can be a strain value associated with no actuation, full actuation, and one or more levels of actuation between no actuation and full actuation.

The system 400 can include one or more sensors 150. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 400 includes a plurality of sensors 150, the sensors can work independently from each other. Alternatively, two or more of the sensors can work in combination with each other. In such case, the two or more sensors can form a sensor network. The sensor(s) 150 can be operatively connected to the processor(s) 410, the data store(s) 420, and/or other elements of the system 400 (including any of the elements shown in FIG. 1).

The sensor(s) 150 can include the sensor 150 (e.g., the strain gauge 155) described in connection with FIG. 1 above. In addition, the sensor(s) 150 can include any suitable type of sensor, now known or later developed, that can acquire information or data about the actuator 110, the shape memory material member 120, or any other portion or component of the system 100 of FIGS. 1-4.

As noted above, the system 400 can include one or more power sources 440. The power source(s) 440 can be any power source capable of and/or configured to energize the actuator 110, as will be described later. For example, the power source(s) 440 can include one or more batteries, one or more fuel cells, one or more generators, one or more alternators, one or more solar cells, and combinations thereof. In some arrangements, the power source(s) 440 can be any suitable source of electrical energy. In some arrangements, the power source(s) 440 can include a heater or some other heat source.

The system 400 can include one or more input interfaces 450. An "input interface" includes any device, component, system, element or arrangement or groups thereof that enable information/data to be entered into a machine. The input interface(s) 450 can receive an input from a vehicle occupant (e.g., a driver or a passenger). Any suitable input interface 450 can be used, including, for example, a keypad, gesture recognition interface, voice recognition interface, display, touch screen, multi-touch screen, button, joystick, mouse, trackball, microphone and/or combinations thereof.

The system 400 can include one or more output interfaces 460. An "output interface" includes any device, component, system, element or arrangement or groups thereof that enable information/data to be presented to a vehicle occupant (e.g., a person, a vehicle occupant, etc.). The output interface(s) 460 can present information/data to a vehicle occupant. The output interface(s) 460 can include a display. Alternatively or in addition, the output interface(s) 460 may include an earphone and/or speaker. Some components of the system 400 may serve as both a component of the input interface(s) 450 and a component of the output interface(s) 460.

The system 400 can include one or more modules, at least some of which will be described herein. The modules can be implemented as computer readable program code that, when executed by a processor, implements one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively or in addition, one or more data stores 420 may contain such instructions. In some arrangements, the module(s) can be located remote from the other elements of the system 400.

In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 400 can include one or more control modules 470. The control module(s) 470 can include profiles and logic for controlling the actuator 110. The control module(s)

470 can use profiles, parameters, or settings loaded into the control module(s) 470 and/or stored in the data store(s) 420, such as the actuation profiles. In some arrangements, the control module(s) 470 can be located remotely from the other elements of the system 400, such as on a remote server, a cloud-based server, or an edge server.

The control module(s) 470 can be configured to cause one or more of the actuators 110 to be activated or deactivated. As used herein, "cause" or "causing" means to make, force, compel, direct, command, instruct, and/or enable an event or action to occur or at least be in a state where such event or action may occur, either in a direct or indirect manner. For instance, the control module(s) 470 can cause the actuator 110 to be selectively activated or deactivated in any suitable manner. For instance, when the actuator 110 includes a shape memory material member 120, the shape memory material member 120 can be heated by the Joule effect by passing electrical current through the shape memory material member. To that end, the control module(s) 470 can be configured to selectively permit, restrict, adjust, alter, and/or prevent the flow of electrical energy from the power source(s) 440 to the shape memory material member 120 of the actuator 110. The control module(s) 470 can be configured to send control signals or commands over a communication network 490 to one or more elements of the system 400.

The control module(s) 470 can be configured to cause the actuator 110 to be activated or deactivated based on various events, conditions, inputs, or other factors. For instance, the control module(s) 470 can be configured to cause the actuator 110 to be activated or deactivated based on a user input. A user can provide an input on the input interface(s) 450.

In some arrangements, the control module(s) 470 can be configured to cause the actuator 110 to be activated or deactivated. In some instances, the control module(s) 470 can be configured to adjust the degree of activation of the actuator 110. For instance, the control module(s) 470 can be configured to cause the actuator 110 to be in an activated configuration that corresponds to its full activated position (e.g., extended to its maximum height). The control module(s) 470 can be configured to activate the actuator 110 to one or more activated configurations between the non-activated configuration and the full activated configuration, such as an extended position but less than its maximum height. The control module(s) 470 can be configured to maintain the activated configuration of the actuator 110. The control module(s) 470 can be configured to adjust the activated configuration of the actuator 110.

The control module(s) 470 can be configured to receive sensor data from the sensor 150. The control module(s) 470 can be configured to analyze the sensor data. For instance, when the sensor is a strain gauge 155, the control module(s) 470 can be configured to determine the strain of the shape memory material member 120 based on the output signals/sensor data from the strain gauge 155. The control module(s) 470 can be configured to compare the strain of the shape memory material member 120 to known strain values of the shape memory material member 120 at different actuation levels, which can be stored in the data store(s) 420. Such comparing can be beneficial in achieving position control of the actuator 110. When the control module(s) 470 detect that the measured resistance matches a desired actuation level, the control module(s) 470 can be configured to take one or more actions. For instance, the control module(s) 470 can maintain the current state of the actuator 110. Thus, additional power is not supplied to the shape memory material member 120. In this way, extra power is not supplied to the shape memory material member 120 and, therefore, is not wasted.

In some arrangements, the control module(s) 470 can be configured to detect changes in the resistance of or measured by the strain gauge 155. The resistance of the strain gauge 155 will stop changing once the critical temperature is reached, even if the shape memory material member 120 is heated beyond the critical temperature. Thus, once the resistance of the strain gauge 155 stops changing, then the control module(s) 470 can recognize that the shape memory material member has reached its critical temperature and that the actuator 110 is at its maximum activated configuration.

Thus, in this example, the actual value of the resistance of the strain gauge 155 does not have to be known. Rather, the control module(s) 470 only needs to monitor the changes in electrical resistance. When the control module(s) 470 detect that the resistance is no longer changing, the control module(s) 470 can be configured to take one or more actions. For instance, the control module(s) 470 can discontinue the supply of electrical energy to the shape memory material member 120. Alternatively, the control module(s) 470 can maintain the current state of the actuator 110. Thus, additional power is not supplied to the shape memory material member 120. In this way, extra power is not supplied to the shape memory material member 120 and, therefore, is not wasted.

Figure 5:
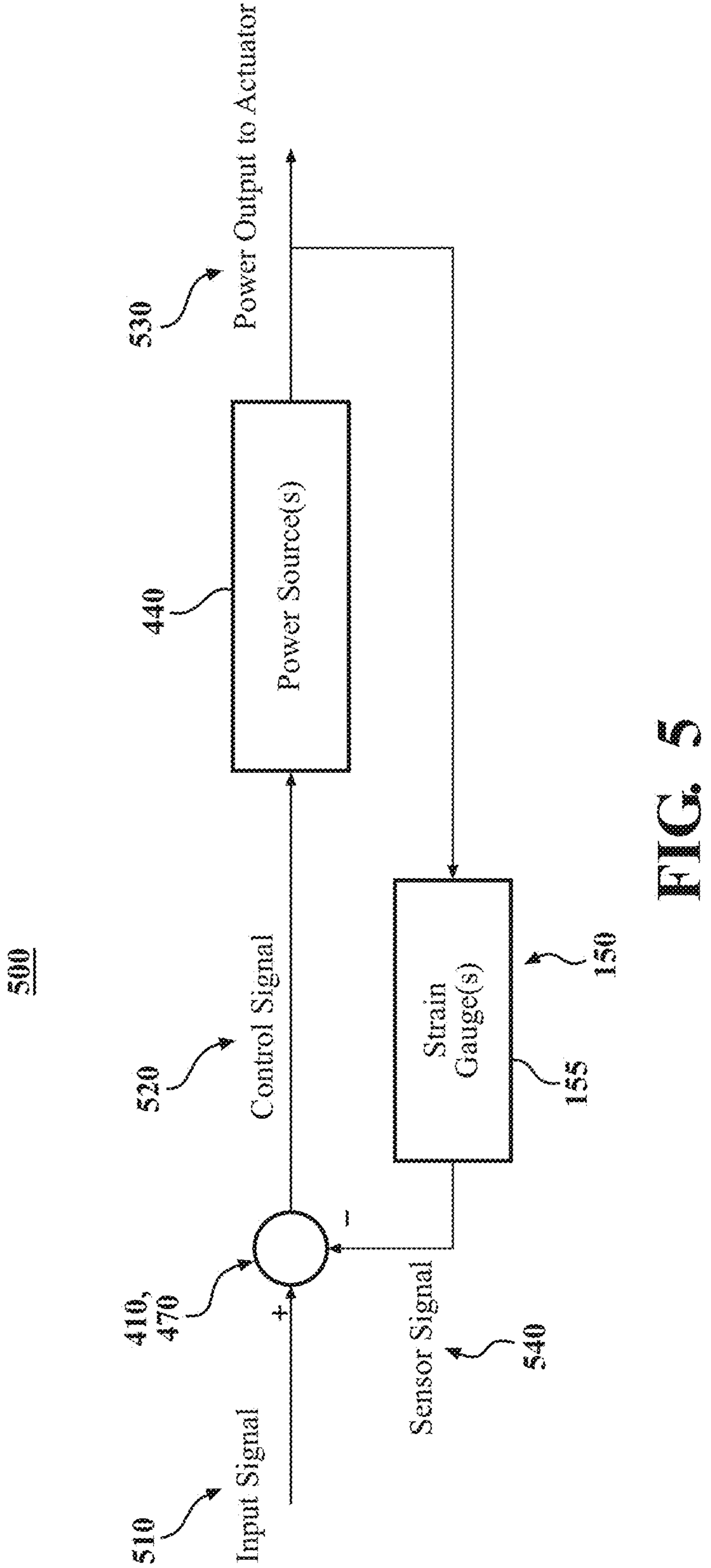
FIG. 5 is an example of a control scheme for a system for contracting member position control and/or state monitoring.

FIG. 5 is an example of a control scheme 500 for a system for monitoring a state of a contracting member. The control scheme 500 can be implemented by the control module(s) 470. An input signal 510 can be provided to the control module(s) 470 and/or processor(s) 410. The input signal 510 can be sent from any suitable source. For instance, the input signal 510 can be generated by a user, such as using a sliding potentiometer, or the input signal 510 can be generated by an external controller/computer. The input signal 510 can be a software signal from a program.

The control module(s) 470 and/or processor(s) 410 can send a control signal 520. The control signal 520 can be used to control a power supply 530 (e.g., power source(s) 440) based on the difference between a sensor signal 540 and the input signal 510. For instance, if an input signal 510 is for a different amount than the current status of the shape memory material member, as evidenced by the sensor signal 540, then the control module(s) 470 can adjust the supply of energy from the power source(s) 440 to the shape memory material member 120 to compensate for the difference between the input signal 510 and the sensor signal 540. The control module(s) 470 can hold the shape memory material member 120 in that position. The control signal 520 can be either a binary signal or a variable signal, depending on the setup.

The power supply 530 can be a power supply of electrical energy. The power supply 530 can have either a constant voltage or a variable voltage based on the control signal 520. The power supply 530 can provide a power output to the actuator 110. As the power output to the actuator 110 changes, it affects the sensor signals 540 output by the strain gauge 155. The sensor signals 540 can be sent to the processor(s) 410 and/or the control module(s) 470.

Arrangements described herein can enable precise position control of the actuator 110 and/or state monitoring of the shape memory material member 120 or other contracting member. In some arrangements, the monitoring and position control can be achieved using a single sensor (e.g., a single strain gauge). In some arrangements, position control can be achieved based on a slider potentiometer position.

With position control, the actuator 110 can move to and hold at a specific position using the control scheme 500 and the sensor signal 540 feedback from the strain gauge 155. The sensor signal 540 can also provide additional information on the status of the SMA wire, which can be used to prevent the shape memory material member 120 or other contracting member from burning or overheating.

It will be appreciated that arrangements described herein are not limited to strain gauges or to monitoring strain or changes in strain. Indeed, arrangements described herein can be configured to monitor the state of the shape memory material member 120 based on any sensor data. Such monitoring can be based on any parameter, characteristic, or metric. The control module(s) 470 can be configured to determine when at least one metric is fulfilled based on feedback from one or more of the sensor(s) 150.

The various elements of the system 400 can be communicatively linked to one another or one or more other elements through one or more communication networks 490. As used herein, the term "communicatively linked" can include direct or indirect connections through a communication channel, bus, pathway or another component or system. A "communication network" means one or more components designed to transmit and/or receive information from one source to another. The data store(s) 420 and/or one or more other elements of the system 400 can include and/or execute suitable communication software, which enables the various elements to communicate with each other through the communication network and perform the functions disclosed herein.

The one or more communication networks 490 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network 490 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network 490 can include wired communication links and/or wireless communication links. The communication network 490 can include any combination of the above networks and/or other types of networks.

Now that the various potential systems, devices, elements and/or components of the system 400 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 6:
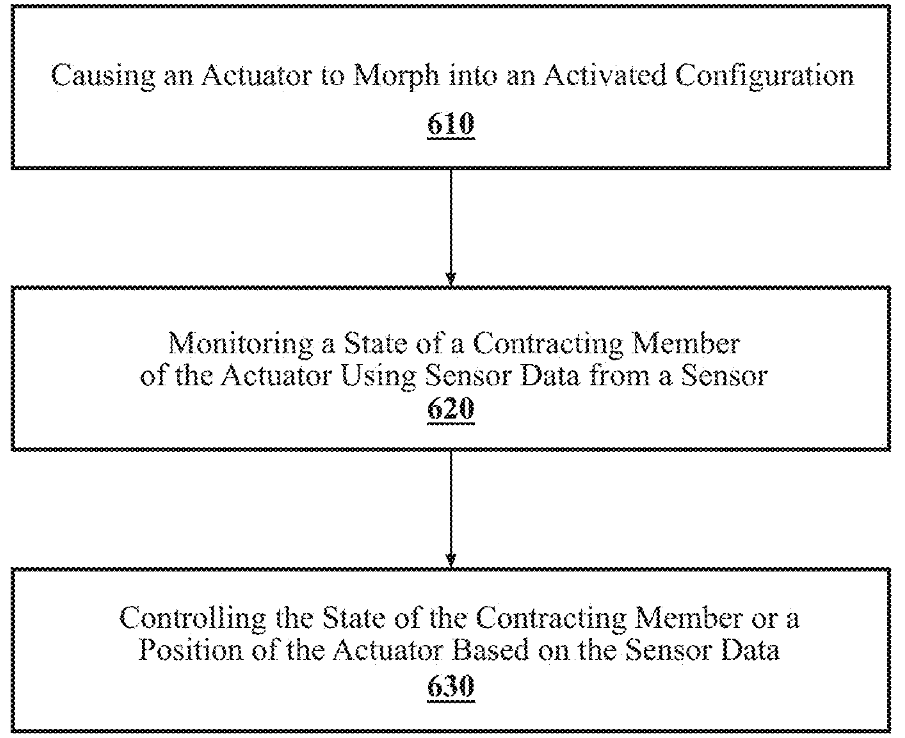
FIG. 6 is an example of a method of monitoring and/or controlling a state of a contracting member.

Turning to FIG. 6, an example of a method 600 of position control and/or state monitoring of a contracting member is shown. At block 610, the actuator 110 can be caused to morph into an activated configuration. Such causing can be performed by the processor(s) 410 and/or the control module(s) 470. For instance, the processor(s) 410 and/or the control module(s) 470 can cause electrical energy from the power source(s) 440 to be supplied to the plurality of actuators 110. More particularly, the processor(s) 410 and/or the control module(s) 470 can cause electrical energy from the power source(s) 440 to be supplied to the contracting member (e.g., the shape memory material member 120) of the actuator 110. As a result, the shape memory material member 120 can contract, which morphs the actuator 110 into the activated configuration where a height of the actuator 110 can increase. The causing can be performed automatically, in response to a user input (e.g., provided on the input interface(s) 450), or in any other suitable way. The method 600 can continue to block 620.

At block 620, a state of the shape memory material member 120 can be monitored. The monitoring can be performed by the control module(s) 470 and/or the processor(s) 410 based on sensor data acquired by the sensor 150 (e.g., the strain gauge 155). In one or more arrangements, the control module(s) 470 and/or the processor(s) 410 can monitor the resistance of and/or measured by the strain gauge 155. In one or more arrangements, the control module(s) 470 and/or the processor(s) 410 can monitor for changes in the resistance of and/or measured by the strain gauge 155. In some arrangements, the control module(s) 470 can compare the sensor signals 540 output by the strain gauge 155 to an input signal 510 provided to the control module(s) 470. In one or more arrangements, the control module(s) 470 and/or the processor(s) 410 can monitor when the resistance of and/or measured by the strain gauge 155 reaches a predetermined level. In some arrangements, the control module(s) 470 and/or the processor(s) 410 can compare the sensor signals or data from the strain gauge 155 to data or information in the data store(s) 420. In one or more arrangements, the control module(s) 470 and/or the processor(s) 410 can monitor when the resistance of and/or measured by the strain gauge 155 stops changing. The method 600 can continue to block 630.

At block 630, the activated configuration of the actuator 110 can be controlled based on the monitored state of the shape memory material member 120. The controlling can be performed by the control module(s) 470 and/or the processor(s) 410. As an example, when the resistance of and/or measured by the sensor 150 stops changing, the control module(s) 470 and/or the processor(s) 410 can cause the supply of electrical energy to the shape memory material member 120 to be discontinued.

As another example, when the resistance of and/or measured by the sensor 150 stops changing and/or reaches a desired level, the control module(s) 470 can maintain the current state of the actuator 110. Thus, the control module(s) 470 and/or the processor(s) 410 can cause the supply of energy to the shape memory material member 120 to be maintained at the current level. In this way, a position of the actuator 110 can be controlled. Such controlling can be performed by the control module(s) 470 and/or the processor(s) 410. Such controlling can be based on sensor data from the strain gauge 155.

The output signals of the strain gauge 155 can stop changing once the critical temperature is reached, even if the shape memory material member 120 is heated beyond the critical temperature. Thus, once the resistance of the strain gauge 155 stops changing, then the control module(s) 470 can recognize that the shape memory material member has reached its critical temperature and that the actuator 110 is at its maximum activated configuration.

Thus, at least in some respects, the actual value of the resistance of the strain gauge 155 does not have to be known. Rather, the control module(s) 470 only needs to monitor the changes in the output signals (e.g., electrical resistance) of the strain gauge 155. When the control module(s) 470 detects that the output signals are no longer changing, the control module(s) 470 can be configured to take one or more actions. For instance, the control module(s) 470 can discontinue the supply of electrical energy to the shape memory material member 120. Alternatively, the control module(s) 470 can maintain the current state of the actuator 110. Thus, additional power is not supplied to the shape memory material member 120. In this way, extra power is not supplied to the shape memory material member 120 and, therefore, is not wasted.

The method 600 can end. Alternatively, the method 600 can return to block 610 or to some other block. The method 600 can be repeated at any suitable point, such as at a suitable time or upon the occurrence of any suitable event or condition. In some instances, the method 600 can include additional blocks.

As noted above, arrangements described herein can be used in connection with there being a plurality of actuators. The actuators can be substantially identical to each other. Alternatively, one or more of the actuators can be different from the other actuators in one or more respects. FIGS. 7-11 show some non-limiting examples of suitable actuators.

Figure 7A:
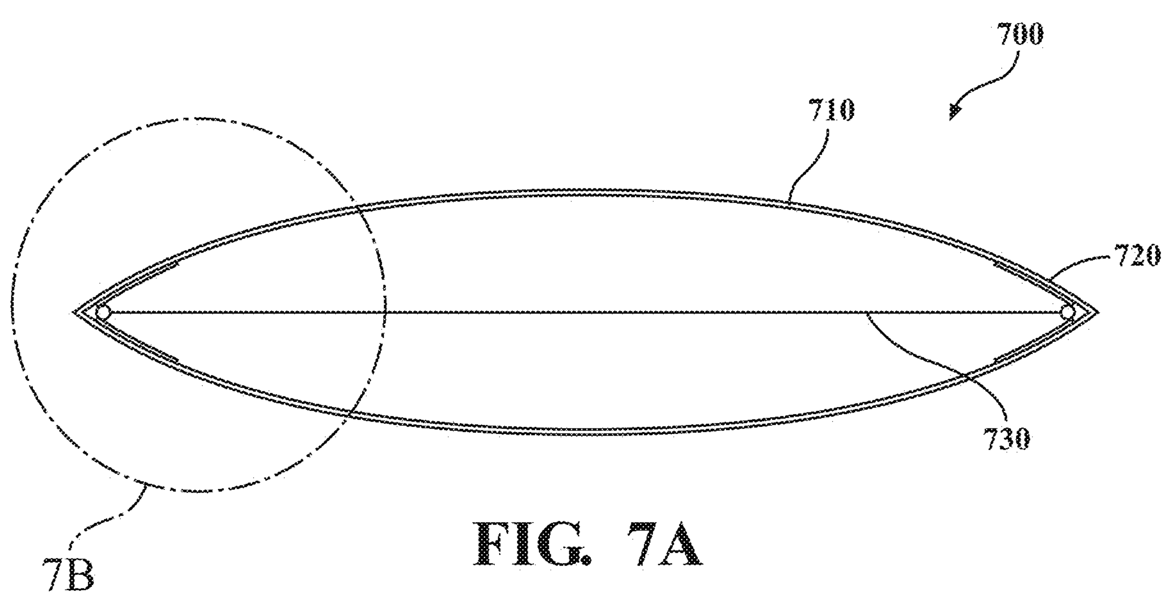
FIG. 7A-7C is a first example of an actuator.
Figure 7B:
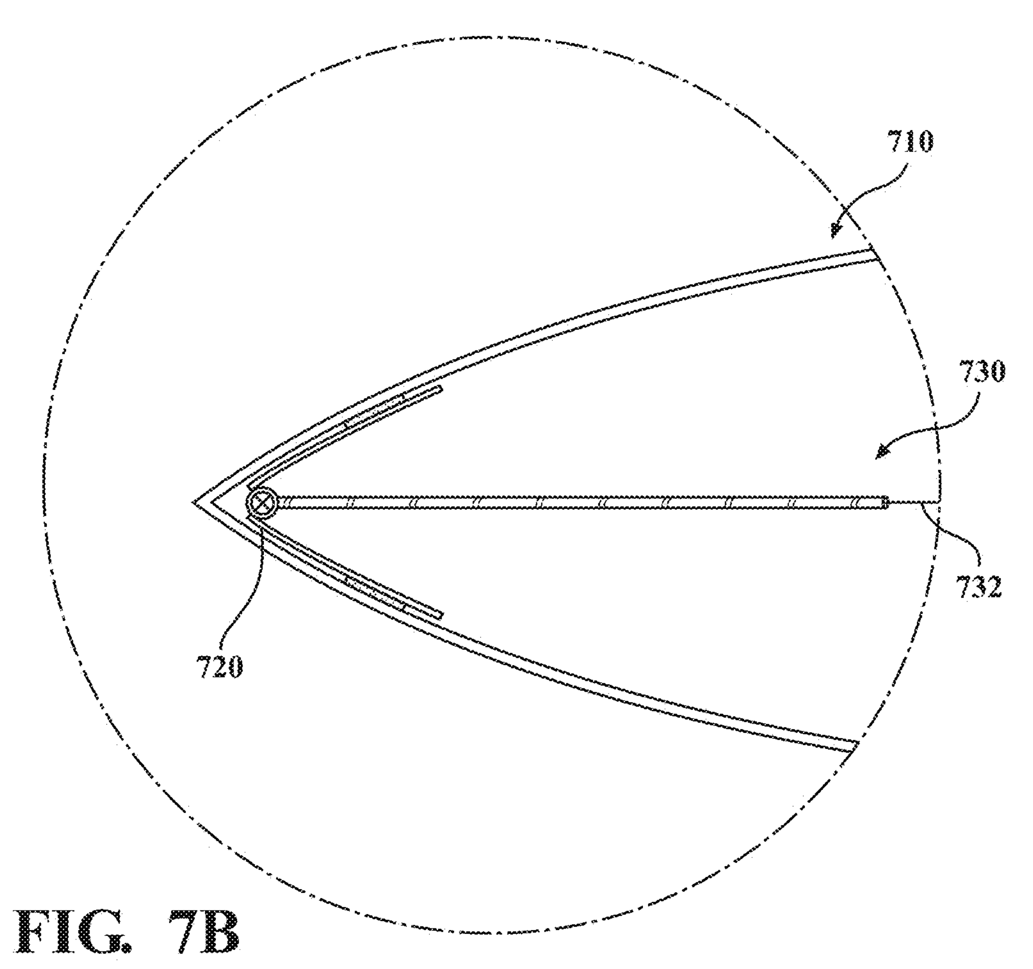
Figure 7C:
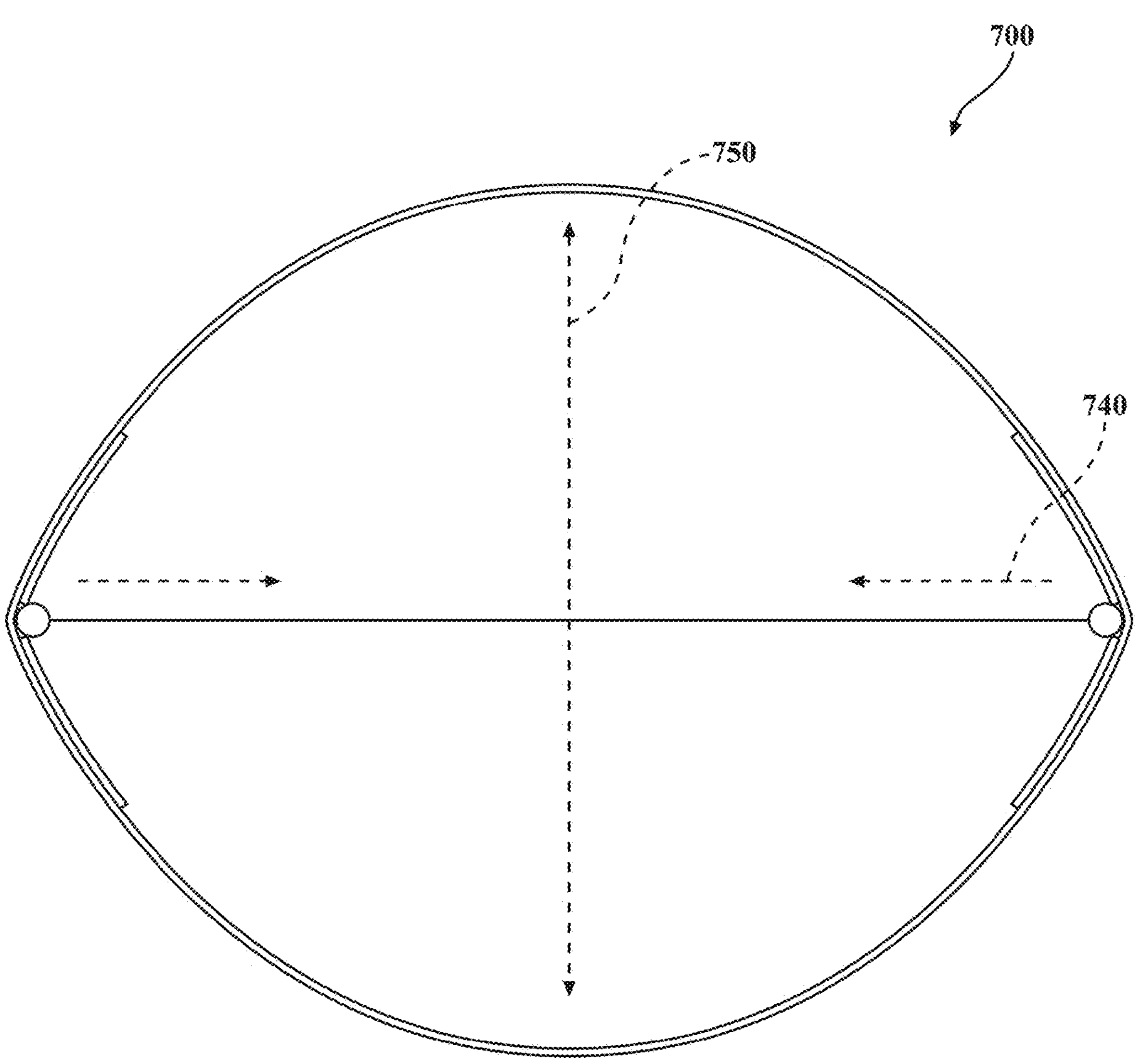

FIGS. 7A-7C show one example of an actuator 700 suitable for use in connection with arrangements described herein. The basic details of the actuator 700 will now be described. Additional details of the actuator 700 are described in U.S. Pat. No. 10,960,793, which is incorporated herein by reference in its entirety.

The actuator 700 is depicted here with an outer skin 710, hinge assemblies 720, and an input-responsive element 730. The actuator 700 can have a first dimension 740 and a second dimension 750.

The input-responsive element 730 can include one or more elements capable of transitioning from a first configuration to a second configuration. The transition of the input-responsive element 730 from the first configuration to the second configuration displaces the hinge assemblies 720 with respect to the outer skin 710 and causes a change in conformation of the outer skin 710. In some implementations, the input-responsive element 730 can include a SMM wire 732. The SMM wire 732 can be a shape memory alloy.

FIG. 7A shows an example of the actuator 700 in a non-activated configuration. When heated, the SMM wire 732 can contract, causing the hinge assemblies 720 to move toward one another. As a result, the actuator 700 can morph from a non-activated configuration to an activated configuration as shown in FIG. 7C. In the activated configuration, the second dimension 750 of the actuator can increase, and the first dimension 740 of the actuator 700 can decrease.

Figure 8A:
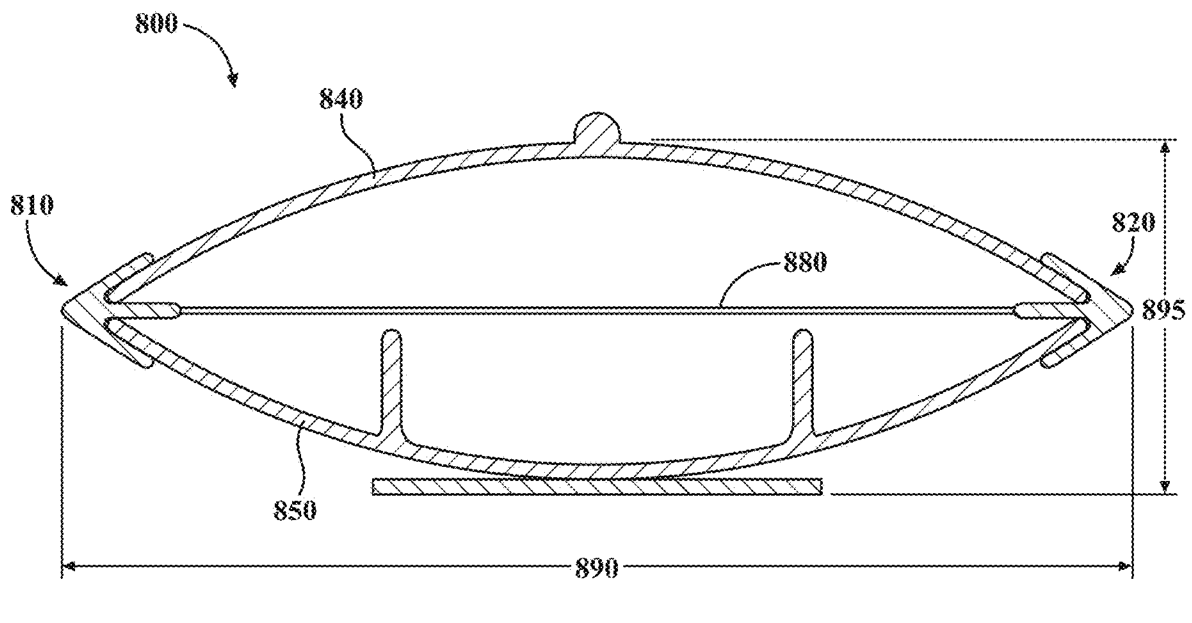
FIGS. 8A-8B is a second example of an actuator.
Figure 8B:
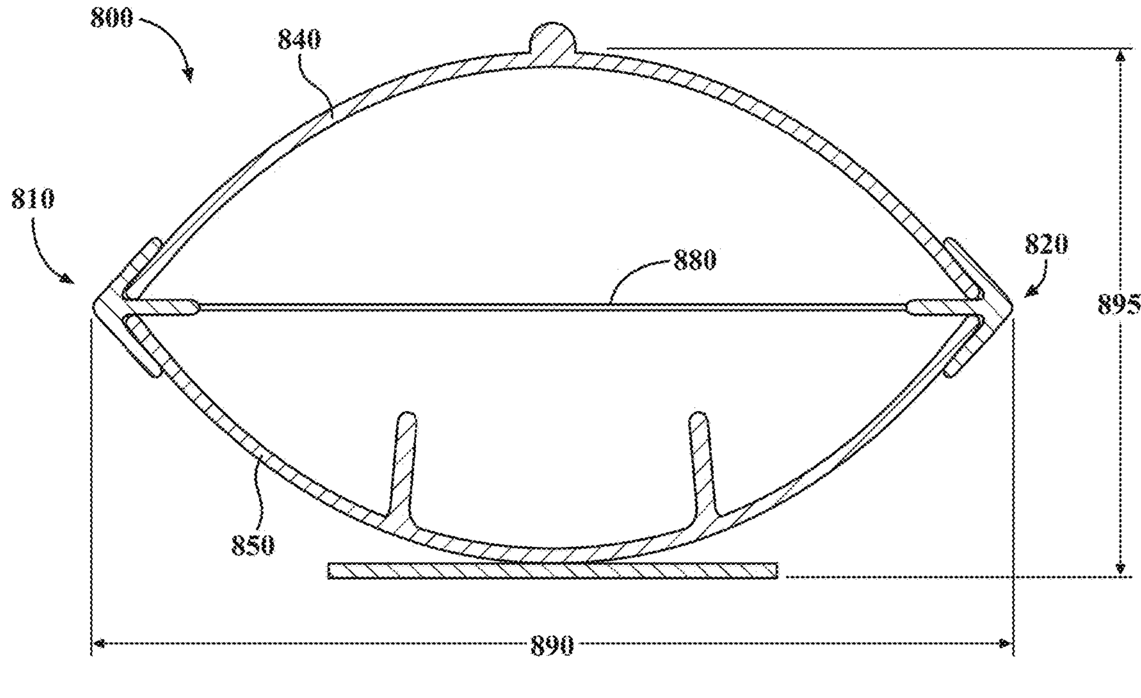

FIGS. 8A-8B show another example of an actuator 800 suitable for use in connection with arrangements described herein. The basic details of the actuator 800 will now be described. Additional details of the actuator 800 are described in U.S. Patent Application Publ. No. 2023/0337827, which is incorporated herein by reference. FIG. 8A shows an example of the actuator 800 in a non-activated condition, and FIG. 8B shows an example of the actuator 800 in an activated condition.

The actuator 800 can include a first endcap 810 and a second endcap 820. The first endcap 810 and the second endcap 820 can be spaced apart. The actuator 800 can include a first outer member 840 and a second outer member 850. The first outer member 840 and the second outer member 850 can have a bowed shape.

The actuator 800 can include one or more shape memory material members 880. The shape memory material members 880 can be operatively connected to the first endcap 810 and the second endcap 820. The phrase "shape memory material" includes materials that change shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 880 can be shape memory material wires. As an example, the shape memory material members 880 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

As noted above, FIG. 8B is an example of the actuator 800 in an activated condition. When an activation input (e.g., electrical energy) is provided to the shape memory material member(s) 880, the shape memory material member(s) 880 can contract. This contraction causes the shape memory material member(s) 880 to pull the first endcap 810 and the second endcap 820 toward each other in a direction that corresponds to the first dimension 890.

Consequently, the ends of the first outer member 840 can be drawn toward each other in a direction that corresponds to the first dimension 890, and the ends of the second outer member 850 can be drawn toward each other in a direction that corresponds to the first dimension 890. As a result, the first outer member 840 and the second outer member 850 can bow outward and away from each other in a direction that corresponds to the second dimension 895. It will be appreciated that the first dimension 890 (i.e., the width) of the actuator 800 can decrease, and the second dimension 895 (i.e., the height) of the actuator 800 can increase.

Figure 9A:
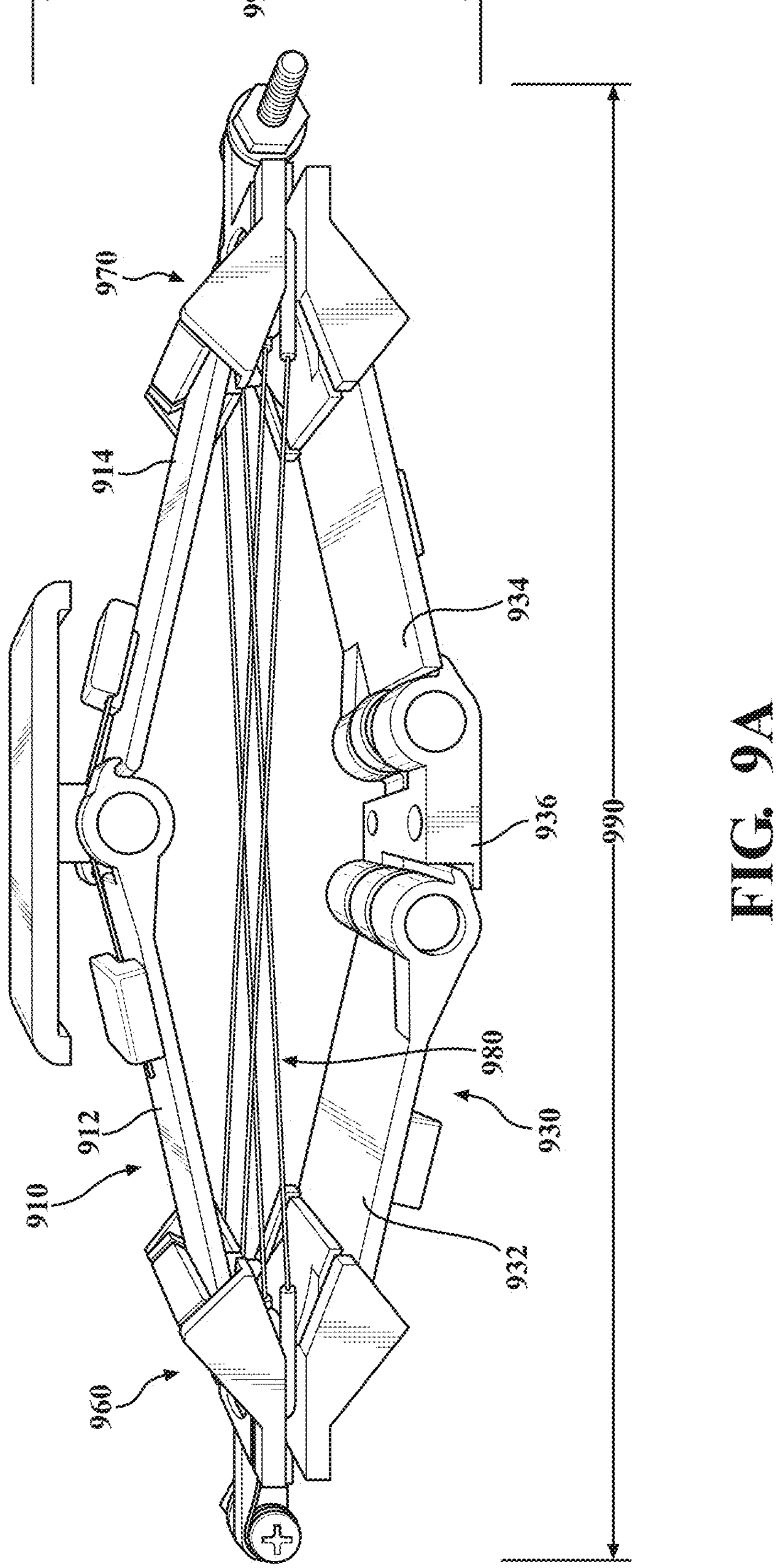
FIGS. 9A-9B is a third example of an actuator.
Figure 9B:
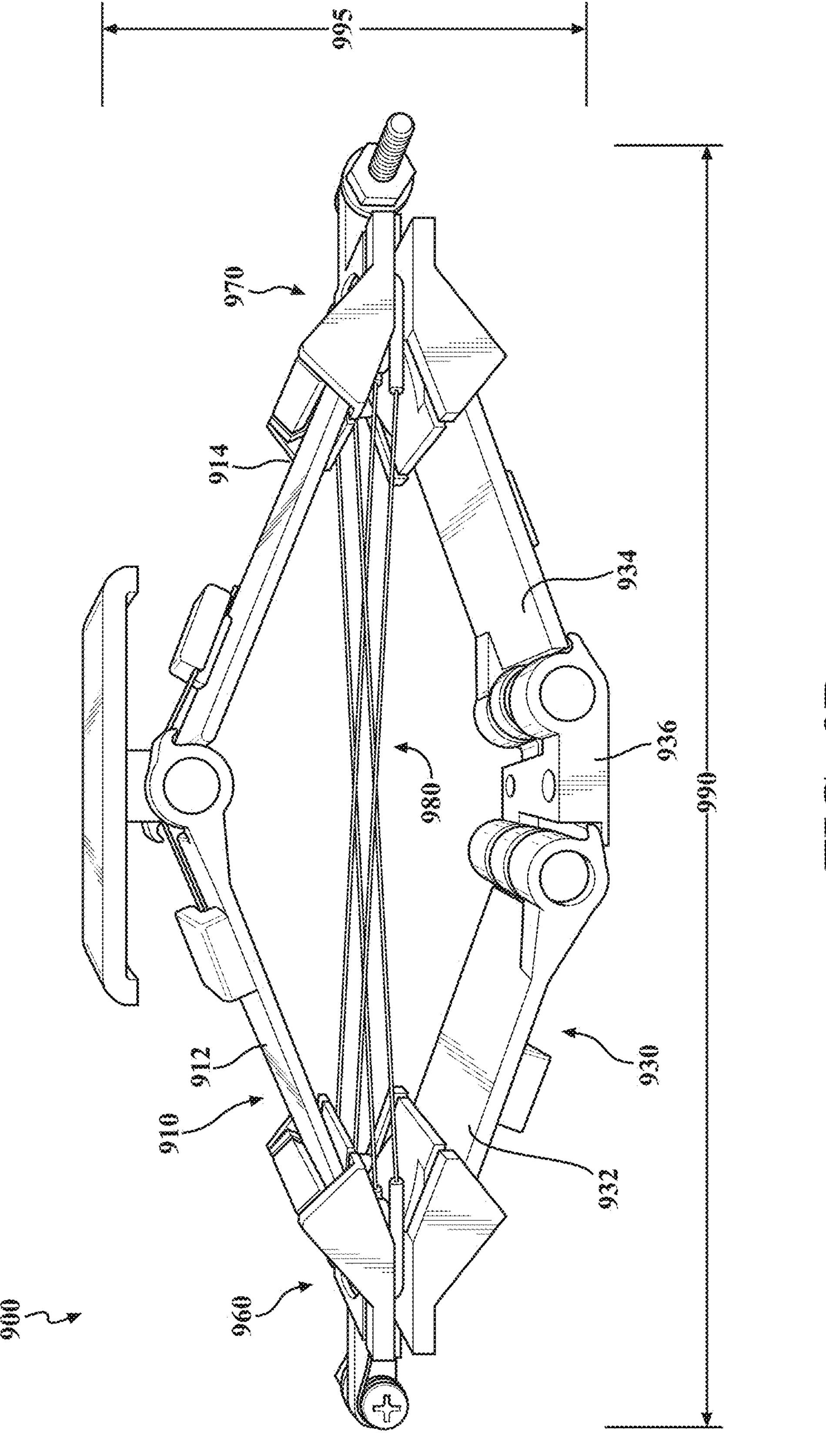

FIGS. 9A-9B show one example of an actuator 900 suitable for use according to arrangements herein. The basic details of the actuator 900 will now be described. Additional details of the actuator 900 are described in U.S. patent application Ser. No. 18/329,217, which is incorporated herein by reference.

The actuator 900 can include a first outer body member 910, a second outer body member 930, a first endcap 960, a second endcap 970, and a shape memory material member 980. The first outer body member 910 can include a first portion 912 and a second portion 914. The first portion 912 and the second portion 914 can be operatively connected to each other such that the first portion 912 and the second portion 914 can move relative to each other. In one or more arrangements, the first portion 912 and the second portion 914 can be pivotably connected to each other. For example, the first portion 912 and the second portion 914 can be pivotably connected to each other by one or more hinges. The first portion 912 and the second portion 914 can be angled relative to each other. As a result, the first outer body member 910 can be generally V-shaped.

The second outer body member 930 can include a first portion 932, a second portion 934, and a base 936. In one or more arrangements, each of the first portion 932 and the second portion 934 can be pivotably connected to the base 936. For example, the first portion 932 can be pivotably connected to the base 936 by one or more hinges, and the second portion 934 can be pivotably connected to the base 936 by one or more hinges. The first portion 932 and the second portion 934 can be located on opposite sides of the base 936.

The actuator 900 can include a first endcap 960 and a second endcap 970. The first endcap 960 and the second endcap 970 can be spaced apart. The actuator 900 can include one or more shape memory material members 980. The shape memory material member(s) 980 can extend between the first endcap 960 and the second endcap 970 in any suitable manner. The shape memory material member(s) 980 can be operatively connected to the first endcap 960 and the second endcap 970.

FIG. 9A shows an example of the actuator 900 in a non-activated configuration. Here, the shape memory material member(s) 980 are not activated. FIG. 9B shows an example of the actuator 900 in an activated configuration. When an activation input (e.g., electrical energy) is provided to the shape memory material member(s) 980, the shape memory material member(s) 980 can contract. This contraction causes the shape memory material member(s) 980 to pull the first endcap 960 and the second endcap 970 toward each other in a direction that corresponds to a first dimension 990. As a result, the first outer body member 910 and the second outer body member 930 can extend outward and away from each other in a direction that corresponds to a second dimension 995. It will be appreciated that, in going from the non-activated condition to the activated condition, the first dimension 990 (i.e., the width) of the actuator 900 can decrease and/or the second dimension 995 (i.e., the height) of the actuator 900 can increase. Further, it will be appreciated that the actuator 900 can deliver a force in a direction that is out of plane or otherwise different from the direction of contraction of the shape memory material member(s) 980.

Figure 10:
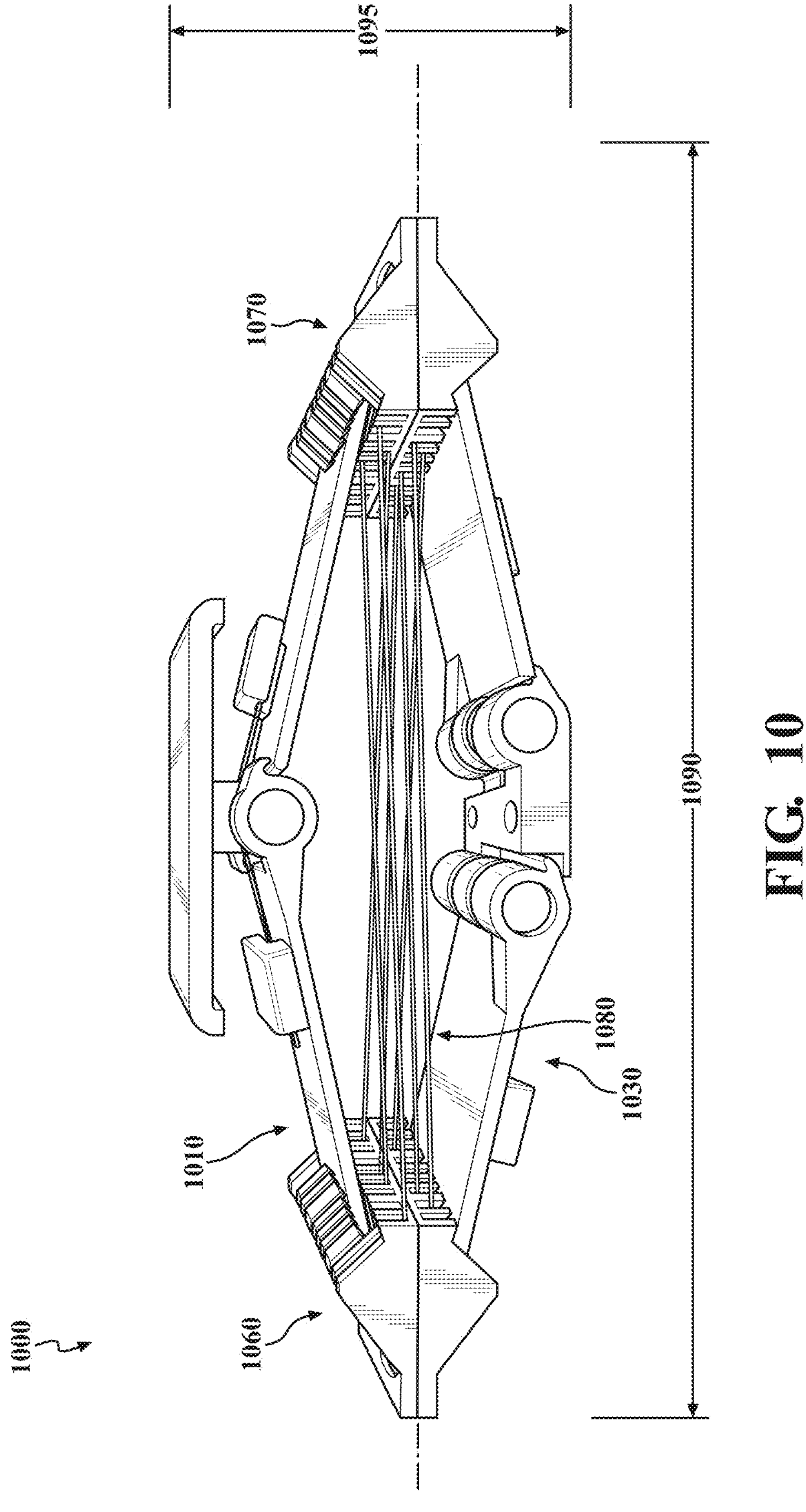
FIG. 10 is a fourth example of an actuator.

FIG. 10 shows one example of an actuator 1000 suitable for use according to arrangements herein. The basic details of the actuator 1000 will now be described. Additional details of the actuator 1000 are described in U.S. patent application Ser. No. 18/329,217, which is incorporated herein by reference.

The actuator 1000 can include a first outer body member 1010, a second outer body member 1030, and one or more shape memory material members 1080. The actuator 1000 includes a first endcap 1060 and a second endcap 1070. The first endcap 1060 and the second endcap 1070 shown in FIG. 10 are different from the first endcap 1060 and the second endcap 1070 shown in FIGS. 7A-7B.

FIG. 10 shows an example of the actuator 1000 in a non-activated configuration. Here, the shape memory material member(s) 1080 are not activated. When an activation input (e.g., electrical energy) is provided to the shape memory material member(s) 1080, the shape memory material member(s) 1080 can contract. This contraction causes the shape memory material member(s) 1080 to pull the first endcap 1060 and the second endcap 1070 toward each other in a direction that corresponds to the first dimension 1090. As a result, the first outer body member 1010 and the second outer body member 1030 can extend outward and away from each other in a direction that corresponds to the second dimension 1095. It will be appreciated that, in going from the non-activated condition to the activated condition, the first dimension 1090 (i.e., the width) of the actuator 1000 can decrease and/or the second dimension 1095 (i.e., the height) of the actuator 1000 can increase.

FIG. 10 shows an example of the actuator 1000 in a non-activated configuration. Here, the shape memory material member(s) 1080 are not activated. When an activation input (e.g., electrical energy) is provided to the shape memory material member(s) 1080, the shape memory material member(s) 1080 can contract. This contraction causes the shape memory material member(s) 1080 to pull the first endcap 1060 and the second endcap 1070 toward each other in a direction that corresponds to the first dimension 1090. As a result, the first outer body member 1010 and the second outer body member 1030 can extend outward and away from each other in a direction that corresponds to the second dimension 1095. It will be appreciated that, in going from the non-activated condition to the activated condition, the first dimension 1090 (i.e., the width) of the actuator 1000 can decrease and/or the second dimension 1095 (i.e., the height) of the actuator 1000 can increase.

Figure 11A:
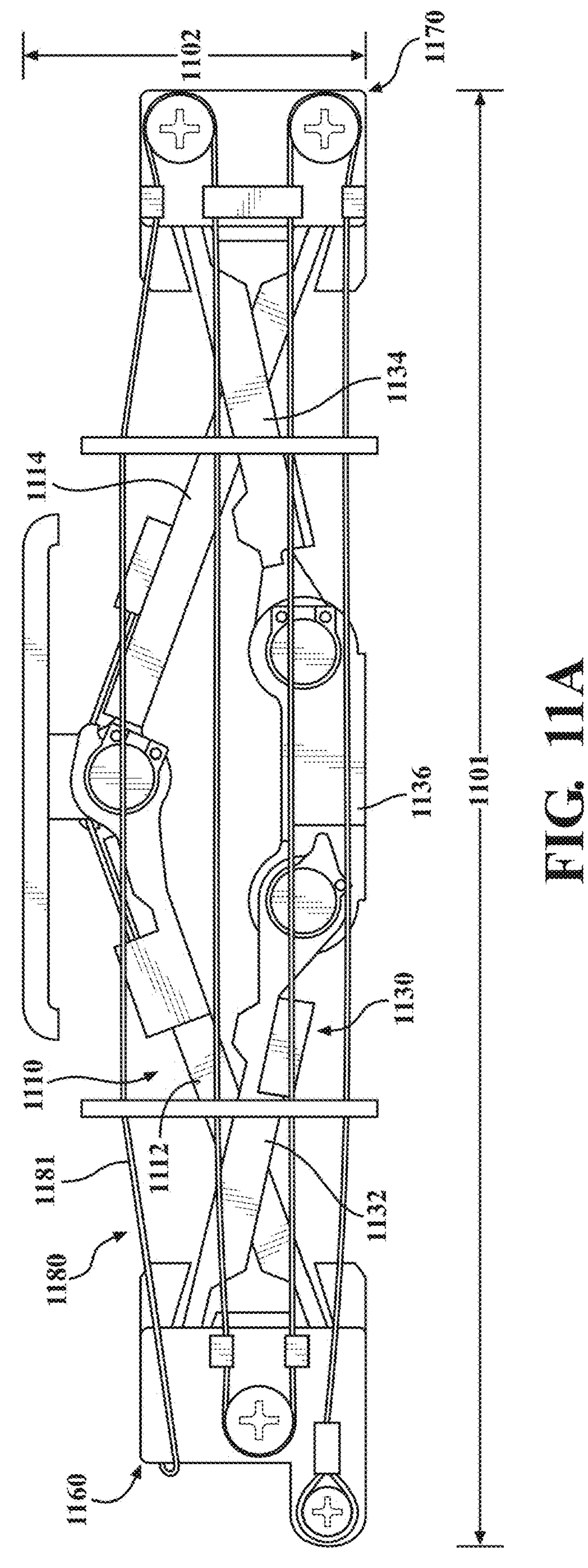
FIG. 11A-11B is a fifth example of an actuator.
Figure 11B:
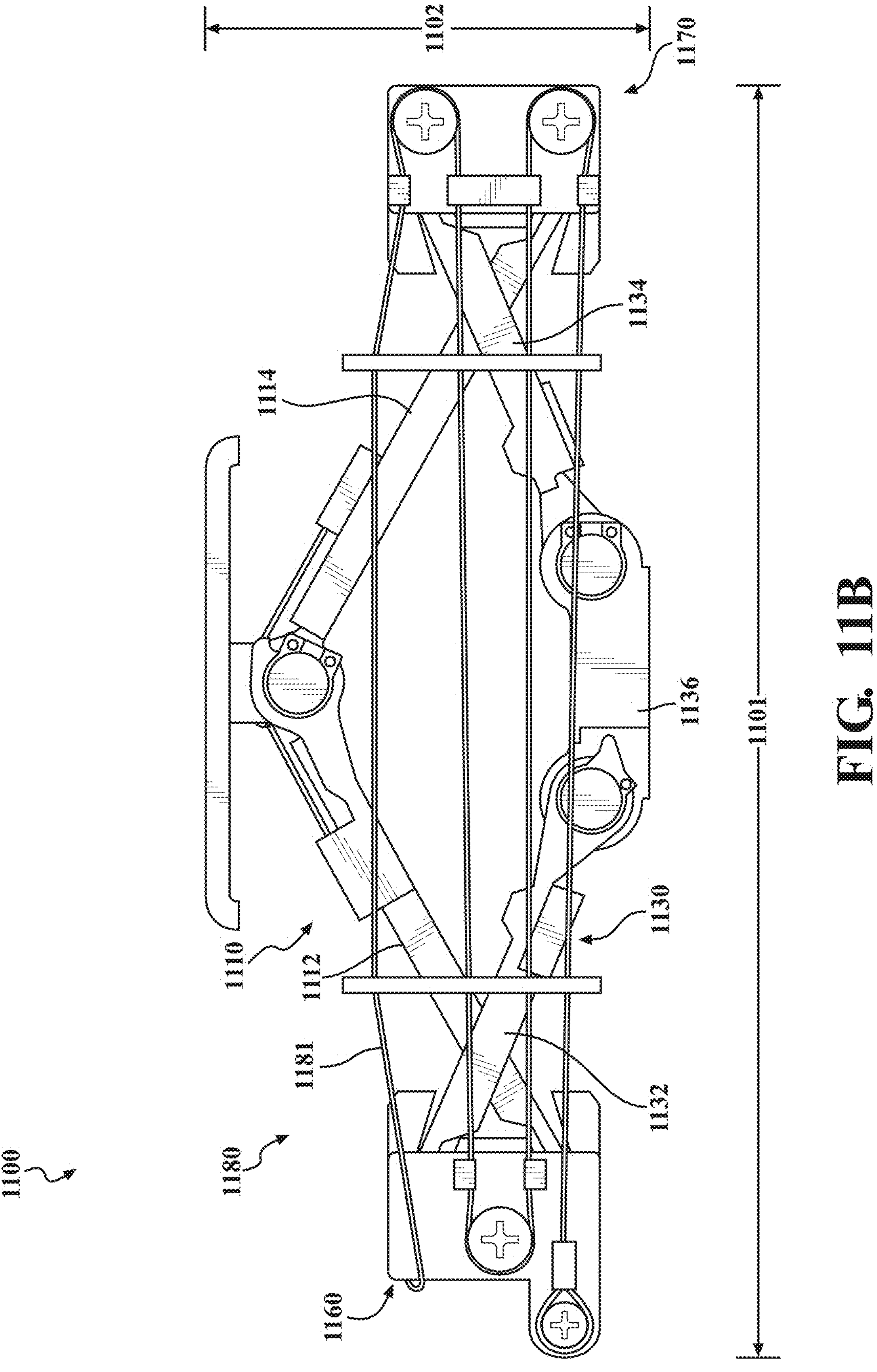

FIGS. 11A-11B show one example of an actuator 1100 suitable for use according to arrangements herein. The basic details of the actuator 1100 will now be described. Additional details of the actuator 1100 are described in U.S. patent application Ser. No. 18/399,026, which is incorporated herein by reference.

The actuator 1100 can include a first outer body member 1110, a second outer body member 1130, a first endcap 1160, a second endcap 1170, and a contracting member 1180, which can be a shape memory material member 1181. The first outer body member 1110 can include a first portion 1112 and a second portion 1114. The first portion 1112 and the second portion 1114 can be operatively connected to each other such that the first portion 1112 and the second portion 1114 can move relative to each other. In one or more arrangements, the first portion 1112 and the second portion 1114 can be pivotably connected to each other. For example, the first portion 1112 and the second portion 1114 can be pivotably connected to each other by one or more hinges. The first portion 1112 and the second portion 1114 can be angled relative to each other. As a result, the first outer body member 1110 can have a generally V-shape.

The second outer body member 1130 can include a first portion 1132, a second portion 1134, and a base 1136. In one or more arrangements, each of the first portion 1132 and the second portion 1134 can be pivotably connected to the base 1136. For example, the first portion 1132 can be pivotably connected to the base 1136 by one or more hinges, and the second portion 1134 can be pivotably connected to the base 1136 by one or more hinges. The first portion 1132 and the second portion 1134 can be located on opposite sides of the base 1136.

The first outer body member 1110 and the second outer body member 1130 can be arranged in a scissored configuration. In one or more arrangements, a portion of the first outer body member 1110 can cross a portion of the second outer body member 1130. More particularly, the first portion 1112 of the first outer body member 1110 and the first portion 1132 of the second outer body member 1130 can cross each other. Alternatively or additionally, the second portion 1114 of the first outer body member 1110 and the second portion 1134 of the second outer body member 1130 can cross each other. In one or more arrangements, the first portion 1112 of the first outer body member 1110 can pass through the first portion 1132 of the second outer body member 1130 and/or the second portion 1114 of the first outer body member 1110 can pass through the second portion 1134 of the second outer body member 1130. Of course, it will be appreciated that, in other arrangements, the first portion 1132 of the second outer body member 1130 can pass through the first portion 1112 of the first outer body member 1110 and/or the second portion 1134 of the second outer body member 1130 can pass through the second portion 1114 of the first outer body member 1110.

The actuator 1100 can include a first endcap 1160 and a second endcap 1170. The first endcap 1160 and the second endcap 1170 can be spaced apart. The actuator 1100 can include one or more contracting member(s) 1180 (e.g., one or more shape memory material members 1181). The contracting member(s) 1180 can extend between the first endcap 1160 and the second endcap 1170 in any suitable manner. The contracting member(s) 1180 can be operatively connected to the first endcap 1160 and the second endcap 1170.

FIG. 11A shows an example of the actuator 1100 in a non-activated configuration. Here, the contracting member (s) 1180 are not activated. FIG. 11B shows an example of the actuator 1100 in an activated configuration. When an activation input (e.g., energy, electrical energy, heat, etc.) is provided to the contracting member(s) 1180, the contracting member(s) 1180 can contract. This contraction causes the contracting member(s) 1180 to pull the first endcap 1160 and the second endcap 1170 toward each other in a direction that corresponds to the first dimension 1101. As a result, the first outer body member 1110 and the second outer body member 1130 can extend outward and away from each other in a direction that corresponds to the second dimension 1102. It will be appreciated that, in going from the non-activated condition to the activated condition, the first dimension 1101 (i.e., the width) of the actuator 1100 can decrease and/or the second dimension 1102 (i.e., the height) of the actuator 1100 can increase. Further, it will be appreciated that the actuator 1100 can deliver a force in a direction that is out of plane or otherwise different from the direction of contraction of the contracting member(s) 1180.

The various examples of actuators shown in FIGS. 7-11 are merely examples and are not intended to be limiting. Other actuators are described in U.S. Pat. Nos. 11,370,330; 11,285,844; 11,091,060; 11,752,901; and 11,897,379, which are incorporated herein by reference in their entireties. Other actuators are described in U.S. Patent Publication Nos. 2023/0191953 and 2023/0136197, which are incorporated herein by reference in their entireties. Still further actuators are described in U.S. patent application Ser. Nos. 18/399,026; 18/452,343; 18/452,376; 18/452,734; 18/453,395; 18/468,029; 18/172,637; 18/433,896; and 63/623,930, which are incorporated herein by reference in their entireties.

Arrangements described herein can be used in any application in which shape memory material-based actuators are used. For instance, arrangements described herein can be used in connection with seat actuators or other actuators in a vehicle. "Vehicle" means any form of transport, including motorized or powered transport. In one or more implementations, the vehicle can be an automobile. While arrangements will be described herein with respect to automobiles, it will be understood that embodiments are not limited to automobiles. In some implementations, the vehicle may be a watercraft, an aircraft, spacecraft, or any other form of transport. However, it will be appreciated that arrangements described herein are not limited to vehicular applications. For instance, arrangements described herein can be used in connection with an office chair, a chair, a massage chair, a gaming chair, a recliner, or any other seat structure, now known or later developed. Of course, arrangements are not limited to seat applications. Arrangements described herein can be used as a massage actuator, lumbar support, or any other robotic/actuator applications that require position control.

It will be appreciated that arrangements described herein can provide numerous benefits, including one or more of the benefits mentioned herein. For example, arrangements described herein can enable detection of the maximum actuated state of a shape memory material member. Arrangements described herein can enable such detection using inexpensive sensors. Arrangements described herein can protect shape memory material members from overheating and/or overstressing. Arrangements described herein can help to maximize the useful life of a shape memory material member. Arrangements described herein can facilitate improved actuator performance. Arrangements described herein can enable precise control of a shape memory material member-based actuator to achieve and/or maintain a specific position.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

an actuator configured to morph, when activated, into an activated configuration in which a dimension of the actuator increases, the actuator including a contracting member;

a sensor configured to acquire sensor data, the contracting member operatively engaging the sensor, the sensor including a strain gauge, the contracting member and the strain gauge being separate structures; and one or more processors operatively connected to monitor a state of the contracting member based on the sensor data.

2. The system of claim 1, wherein the contracting member includes an external portion that extends external to the actuator.

3. The system of claim 2, wherein the external portion of the contracting member operatively engages the strain gauge.

4. The system of claim 3, wherein the strain gauge is operatively connected to a spring structure, and wherein the external portion of the contracting member operatively engages the spring structure.

5. The system of claim 4, wherein the external portion of the contracting member is wrapped around at least a portion of the spring structure.

6. The system of claim 4, wherein the spring structure is configured to deform when the contracting member contracts, whereby the deformation of the spring structure causes a sensor signal output by the strain gauge to change.

7. The system of claim 6, wherein the spring structure includes a beam portion, and wherein the strain gauge is operatively connected to the beam portion.

8. The system of claim 1, wherein the contracting member is a shape memory material member.

9. The system of claim 8, wherein the shape memory material member is a shape memory alloy.

10. The system of claim 8, wherein the shape memory material member is a wire.

11. The system of claim 1, wherein the one or more processors are configured to:

control a position of the actuator using the sensor data.

12. The system of claim 1, wherein the one or more processors are configured to:

control the state of the contracting member using the sensor data.

13. The system of claim 12, wherein monitoring the state of the contracting member includes monitoring a resistance of the strain gauge or changes in a resistance of the strain gauge.

14. The system of claim 12, wherein, when at least one metric is fulfilled based on sensor data, the one or more processors are configured to discontinue a supply of energy to the contracting member.

15. The system of claim 12, wherein, when at least one metric is fulfilled based on sensor data, the one or more processors are configured to substantially maintain a supply of energy to the contracting member at a current level.

16. The system of claim 1, wherein the contracting member includes a plurality of mechanically isolated zones, the plurality of mechanically isolated zones being defined by a plurality of isolation points along the contracting member.

17. The system of claim 16, wherein the plurality of isolation points are areas where the contracting member is crimped.

18. The system of claim 16, wherein the contracting member operatively engages the sensor in one of the plurality of mechanically isolated zones that is external to the actuator.

19. A method of monitoring a state of a contracting member used in an actuator, the contracting member operatively engaging a sensor, the sensor being a strain gauge, the contracting member and the strain gauge being separate structures, the method comprising:

causing the actuator to morph into an activated configuration;

monitoring a state of the contracting member using sensor data from the sensor; and controlling, based on the sensor data, at least one of:

an activated state of the actuator; and a position of the actuator.

20. The method of claim 19, wherein monitoring the state of the contracting member includes monitoring a resistance of the strain gauge or a change in resistance of the strain gauge.

21. The method of claim 19, wherein controlling an activated state of the actuator based on the sensor data includes:

discontinuing a supply of energy to the contracting member when at least one metric is fulfilled based on the sensor data.

22. The method of claim 21, wherein controlling an activated state of the actuator based on the sensor data includes:

substantially maintaining a supply of electrical energy to the contracting member when at least one metric is fulfilled based on the sensor data.

23. The method of claim 19, wherein the contracting member is a shape memory material member.

24. The method of claim 23, wherein the shape memory material member is a shape memory alloy.

25. The method of claim 23, wherein the shape memory material member is a wire.

26. The method of claim 19, wherein the strain gauge is operatively connected to a spring structure, and wherein the contracting member operatively engages the spring structure.

27. The method of claim 26, wherein the spring structure is configured to deform when the contracting member contracts, whereby the deformation of the spring structure causes an output signal of the strain gauge to change.

* * * * *